(12) United States Patent
Watanabe et al.

(10) Patent No.: US 7,205,500 B2
(45) Date of Patent: Apr. 17, 2007

(54) NON-CONSUMABLE ELECTRODE WELDING TORCH AND WELDING HEAD WITH THE TORCH

(75) Inventors: Hiroshi Watanabe, Kure (JP); Takashi Sato, Kure (JP); Toshiharu Myoga, Kure (JP); Koichi Mitsuhata, Kure (JP); Masahiro Kanatani, Kure (JP); Keiji Ueda, Kure (JP); Seiji Kikuhara, Kure (JP); Toshiharu Nagashima, Kure (JP); Shigeru Fujimoto, Kure (JP); Ryuichi Etoh, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/225,177

(22) Filed: Sep. 14, 2005

(65) Prior Publication Data

US 2006/0076320 A1   Apr. 13, 2006

(30) Foreign Application Priority Data

Oct. 13, 2004   (JP)   ............................. 2004-298354

(51) Int. Cl.
*B23K 9/167* (2006.01)
(52) U.S. Cl. .................. 219/75; 219/60 A; 219/125.11
(58) Field of Classification Search .................. 219/75, 219/60 A, 125.11
See application file for complete search history.

(56) References Cited

U.S. PATENT DOCUMENTS 4,379,215 A   4/1983   Rohrberg
4,769,521 A *   9/1988   Sugiyama .................... 219/75
5,841,089 A   11/1998   Martinenas
2006/0076318 A1 *   4/2006   Watanabe et al. ......... 219/60 A

FOREIGN PATENT DOCUMENTS

| JP | 9-271939 | 10/1997 |
| JP | 10-193103 | 7/1998 |
| JP | 2001-225165 | 8/2001 |

OTHER PUBLICATIONS

English Language Abstract of JP 9-271939.
English Language Abstract of JP 10-193103.
English Language Abstract of JP 2001-225165.
U.S. Appl. No. 11/192,174 to Watanabe et al., filed on Jul. 29, 2005.

* cited by examiner

*Primary Examiner*—Clifford C. Shaw
(74) *Attorney, Agent, or Firm*—Greenblum & Bernstein, P.L.C.

(57) ABSTRACT

An ultra-flat non-consumable electrode welding torch which allows performing a welding operation through a narrow gap between adjacent piping such as welding piping of a boiler panel, to be mounted on a compact automatic welding head, and a welding head provided with such a welding torch are to be provided. As a gas supply mechanism that supplies a shield gas to a welding section formed at the tip of the non-consumable electrode through inside of the torch body for the non-consumable electrode welding, a gas supply path is provided for supplying the shield gas from an outer gas space in a double ring shaped gas space provided around a non-consumable electrode and divided by a partition wall, to an inner gas space through a plurality of orifices provided at regular intervals in the partition wall, and the gas is blown from the inner gas space to the region around the non-consumable electrode through a metal mesh plate. A gas outlet opening provided in the inner gas space is oriented in a different direction from the gas blowing direction through the orifice.

15 Claims, 17 Drawing Sheets

(a)

(b)

(a)

(b)

(a)

(b)

(a)

(b)

(c)

NON-CONSUMABLE ELECTRODE WELDING TORCH AND WELDING HEAD WITH THE TORCH

TECHNICAL FIELD

The present invention relates to butt-welding of a fixed piping, and more particularly to a non-consumable electrode welding torch to be used for automatic pipe-to-pipe circumferential multilayer welding of a plurality of small-diameter thick-wall pipings, performed in an ultra-narrow working space, and to a welding head including the torch and a unit that supplies the torch with power, a shield gas and a coolant.

BACKGROUND ART

Numerous automatic welding apparatuses for piping have been introduced for the automatic circumferential multilayer welding of butted fixed pipings. The automatic welding apparatus refers to an apparatus including a welding head, a welding power source, a control unit, a coolant pump and so on, among which a torch body, and a unit including an electrode attached to the torch and a gas supply mechanism that supplies a shield gas around the electrode etc., will be hereinafter referred to as a welding torch, and such a welding torch, and a unit including members that supply the welding torch with power, a shield gas and a welding wire, and a coolant that cools the welding torch, will be hereinafter referred to as a welding head.

Referring to an automatic TIG (Tungsten Inert Gas) welding apparatus for piping in particular, which employs the TIG welding method, the welding head is clamped to the fixed piping, and a main body 1 of the welding torch is rotated around the outer circumference of the piping with the welding wire inserted into the welding section, so as to automatically perform the multilayer welding of the circumference of a butted portion of two tubes.

A furnace wall of a boiler is, as shown in FIG. 28, constituted of a plurality of pipings 28 aligned in a plane and connected to one another via a membrane bar 29, and includes butt-welded portions between the piping 28 and another piping 28. At the butt-welded portion of the two pipings 28 and 28, the butted portion 32 of the pipings 28 and 28 is beveled so that a welding bead is provided thereon, and the membrane bar 29 is not attached to the region close to the welding section for ease of the welding operation and hence a space is secured around the pipings 28 and 28.

On this boiler furnace wall, a spacing between the pipings 28 and 28 disposed parallel to each other is as narrow as approximately 17 mm, and this is where the butt-welding section is located. The main body 1 of the welding torch mounted on the welding head used for various conventional piping welding apparatuses is unable to pass through such a narrow working space. Accordingly, an ultra-flat welding torch has been proposed, in Japanese Published Unexamined Patent Application No. H09-271939 and Japanese Published Unexamined Patent Application No. H10-193103.

DISCLOSURE OF THE INVENTION

Problems to be Solved by the Invention

The functions required for the welding torch are (1) retention of an electrode and power supply to the electrode, (2) cooling the electrode and (3) shielding the welding section with a gas.

As the welding torch becomes smaller in dimensions, it becomes more difficult for the welding torch to sufficiently perform these three functions. Accordingly, for example, a material excellent in heat conduction and electric conductivity is employed to constitute the welding torch, so as to enable continuous use preventing burnout of the welding torch during use, and a coolant (mostly water) is directly supplied to the welding torch for cooling.

In the case of the TIG welding, a typical non-consumable electrode welding method, it is necessary not only to supply an inert gas or a mixture of the inert gas and an active gas to the welding torch for protecting the power source for the welding operation and the welding section, but to supply the coolant directly to the welding torch for cooling it, depending on the situation.

In most of the existing automatic welding apparatuses, the welding head having the welding torch mounted at the tip portion is provided with a cable or a hose attached thereto, through which the power, gas, coolant and wire are supplied directly to the welding torch.

In the case of the automatic TIG welding, the tungsten electrode has to be replaced with the progress of the welding operation, for performing the welding under a stable condition, particularly for preventing degradation of arc start performance. Also, when performing the welding at a narrow space where a sufficient stroke for welding in a radial direction of the piping cannot be secured, the projection length of the tungsten electrode may have to be readjusted at an initial welding stage and an overlay welding stage.

When the welding torch is designed to be smaller for the welding at a narrow space, the components of the welding torch naturally have to be smaller. When the components, such as the tungsten electrode which has to be frequently replaced and adjusted during the welding operation, and other consumable items become smaller, the welding work efficiency and the maintenance efficiency are inevitably degraded, and therefore a dramatic improvement in the work efficiency cannot be expected, even though an automatic welding apparatus suitable for an operation at a narrow space is developed.

Also, in the case where the automatic welding apparatus is used in a plant with well-arranged welding facilities, where sufficient spare parts and skilled engineers are available, it is possible to minimize unfavorable factors such as a delay in welding operations even though the maintenance performance of the automatic welding apparatus is poor. However, when the number of automatic welding apparatuses and spare parts, as well as available engineers is limited, as in overseas installation sites, once the automatic welding apparatus malfunctions, it takes a considerable amount of time for restoration.

Further, it requires acute carefulness in replacing very small components of the automatic welding apparatus, at an actual welding operation site. For example, when removing a component from and attaching it to the welding head with a screw, small screws are often lost, by which the welding operation has to be suspended. In addition in the case of a removable welding torch, when foreign matter such as sputtering or grinding chips intrude into a joint between the welding torch and a welding head member connected to the base portion of the torch, the mounting position of the welding torch may be misaligned at the joint with the welding head member, or a gap created at the joint may cause insufficient cooling of the welding torch, thus resulting in overheating of the welding torch. Therefore, a structure by which a removable welding torch that can be easily mounted to or removed from the welding head member, and can be securely fixed at a predetermined position has been demanded.

The following covers the problems with the gas shield of the welding section.

The gas shield of the welding torch has to be performed such that the gas injected from a gas outlet of the welding torch constitutes a laminar flow to enclose the entire welding section, for isolation from the air. However, the ultra-flat welding torch is not thick enough to secure a sufficient length of the gas outlet, and therefore the gas shield of the welding section has been a very difficult issue.

Japanese Published Unexamined Patent Application No. H10-193103 discloses a structure by which a welding torch can be formed of an arc-shaped plate of a uniform thickness and provided with a shield gas outlet located close to a non-consumable electrode, and a gas lens such as a metal mesh plate is attached to the gas outlet so that the shield gas is evenly blown around the arc, thus to stabilize the arc.

With such structure, however, though the gas lens serves to create a laminar flow of the gas, the uneven flow speed of the gas before passing through the gas lens is not adjusted to be uniform even after passing through the gas lens. In other words, the gas flow of uneven speed supplied in a space close to the gas outlet affects the gas flow after passing through the gas lens.

Accordingly, when the gas supply is increased to shield a more extensive range for an overlay welding of the final layer, the gas flow speed is increased since the diameter of the gas supply port leading to the outlet is fixed, which makes the initial flow speed of the shield gas uneven, and therefore the entire welding section cannot be evenly shielded.

In the invention according to Japanese Published Unexamined Patent Application No. H09-271939, a flat torch body is provided with a shield gas supply hole so that the shield gas is introduced into a space inside the torch body, and the gas passes through a plurality of orifices formed around a non-consumable electrode. In addition, around the non-consumable electrode in the torch body, also a metal mesh plate including a plurality of coarse and fine metal meshes is fitted so as to be used for the gas lens, which is retained by a short-scale, large-diameter shield cup screwed into the torch body.

Accordingly, the shield gas that has passed through the orifices forms a uniform flow after passing through the metal mesh plate, and is discharged through the shield cup thus to form an appropriate shield gas atmosphere at the welding point of the piping. With such a structure, however, a certain distance has to be secured between the orifices and the gas lens taking the gas flow speed into account, and besides a margin has to be secured for supporting a considerable portion of the thickness of the shield cup, since the shield cup is of a screw-in type. Namely, the above invention does not provide a welding torch that can be made as thin as, for example, 7 mm. In addition, since the metal mesh plate is located close to the non-consumable electrode, when the projection length of the non-consumable electrode from the torch is short, the metal mesh plate may be damaged by the heat of the arc formed at the tip of the non-consumable electrode.

Further, the torch according to Japanese Published Unexamined Patent Application No. H09-271939 includes an upper and a lower gas space, so that the shield gas is supplied from the upper gas space to the lower gas space through a plurality of orifices formed in a partition wall, so as to be blown out through an outlet opening located at a bottom portion of the lower gas space. Such a structure has the following drawbacks.

Namely, the torch has to be made thicker, and besides the shield gas introduced into the lower gas space from the upper gas space through the orifices is blown out of the lower gas space through the opening for the gas blowing provided at the bottom. Accordingly, the gas is blown in the same direction at the orifices and at the outlet opening, and hence the shield gas is blown out through the outlet opening at the bottom of the torch without residing in the lower gas space. The shield gas thus blown out around the non-consumable electrode is prone to incur uneven flow speed as a whole.

It is an object of the present invention to provide a compact, ultra-flat non-consumable electrode welding torch capable of forming a shield gas flow of a uniform speed as a whole around the non-consumable electrode, which allows performing a welding operation through a narrow gap between adjacent pipings such as welding of a piping of a boiler panel, and a welding head provided with such a welding torch, so as to constantly obtain high-quality welded products through a reduced number of steps in the welding process.

It is another object of the present invention to improve maintenance efficiency of a welding head designed for a fixed structure to thereby upgrade the reliability of the welding head, and to reduce the number of steps in the welding process and prevent a delay in the welding operation.

Means for Solving the Problems

To achieve the foregoing object, the present invention provides the following.

A present invention according to claim 1 provides a non-consumable electrode welding torch, comprising a torch body; a non-consumable electrode fixed inside the torch body so as to project outward from the torch body; and a gas supply mechanism that supplies a shield gas through a space inside the torch body to a welding section formed at a tip of the non-consumable electrode; wherein the gas supply mechanism includes, around the non-consumable electrode, a double annular gas space including an outer gas space and an inner gas space divided by a partition wall; a gas supply path connected to the outer gas space for introducing the gas from outside of the torch body; a plurality of orifices located at regular intervals in the partition wall between the outer gas space and the inner gas space; a gas outlet opening provided in the inner gas space, oriented in a direction aligned with a projecting direction of the non-consumable electrode from the torch body, which is different from a blowing direction of the orifices; and a metal mesh plate located at the outlet opening.

In order to isolate the welding section from the ambient air when welding a piping, thus to obtain a stabilized arc and high-quality welded metal, the shield gas flow blown out from the welding torch has to be a laminar flow of a uniform flow speed as a whole. It is a known technique to provide a gas lens such as a metal mesh plate at the outlet of a gas from the welding torch, to form a laminar gas flow. However, since the metal mesh plate is unable to completely rectify the uneven gas flow speed, the gas flow speed has to be made uniform before passing through the metal mesh plate, in the entire portion of the outlet.

In the present invention according to claim 1, the shield gas is supplied through the gas supply path to the outer gas space and then a plurality of orifices in the partition wall between the outer gas space and the inner gas space, i.e. the shield gas is supplied from the outer gas space into the inner gas space, and then through the gas outlet opening and the metal mesh plate, to be blown out around the non-consumable electrode.

At this time, once the shield gas is introduced from the outer gas space into the inner gas space through the orifices in the partition wall, the shield gas changes direction, and is blown out around the non-consumable electrode through the gas outlet opening and the metal mesh plate. Moreover, since the orifices are located at regular intervals in the partition wall, the flow speed of the shield gas introduced into the inner gas space through each orifice becomes generally uniform, and also the flow direction of the shield gas is changed in the inner gas space, to thereby be evenly blown out around the non-consumable electrode, through the gas outlet opening and the metal mesh plate.

As described above, in the conventional torch according to Japanese Published Unexamined Patent Application No. H09-271939, the shield gas is supplied from the upper gas space to the lower gas space through the orifices in the partition wall, to be straightly blown out through the gas outlet opening toward the non-consumable electrode. However, in this structure, the shield gas is blown out of the gas outlet opening without residing in the lower gas space, since the blowing direction of the shield gas from the lower gas space out of the gas outlet opening located at the bottom thereof is the same as the direction of the shield gas blown into the lower gas space through the orifices in the partition wall, in which case the shield gas flow speed around the non-consumable electrode is prone to be uneven.

On the other hand, with the structure according to a first aspect of the present invention, the flow speed of the shield gas blown out around the non-consumable electrode through the gas outlet opening and the metal mesh plate is uniform, and the shield gas evenly encloses the non-consumable electrode as a whole. Therefore, the torch can be made thinner compared with the conventional structure including the bi-level, upper and lower gas spaces through which the shield gas is supplied, so as to enable welding a butted portion of a fixed piping through a narrow gap, for example, in a boiler panel piping. Accordingly, an ultra-flat non-consumable electrode welding torch that can be mounted on a compact automatic welding head can be provided, so as to constantly obtain high-quality welded products through a reduced number of steps in the welding process.

A second aspect of the present invention provides the non-consumable electrode welding torch according to claim 1, wherein a total of radial sectional area of the plurality of orifices is smaller than a radial sectional area of the gas supply path.

In the present invention according to claim 2, since the total of the radial sectional area of the plurality of orifices is smaller than the radial sectional area of the gas supply path, the gas pressure in the outer gas space becomes higher than in the in the inner gas space, which increases the uniformity of the blowing speed of the shield gas through the orifices so as to supply the shield gas at a uniform flow speed to the welding section, thus to enhance the shielding effect of the gas.

A third aspect of the present invention provides the non-consumable electrode welding torch according to claim 1, wherein an intersection of an axial center line of the gas supply path and the partition wall in the double annular gas space is located at a middle point between two orifices adjacent to each other.

In the present invention according to claim 3, since the intersection of the axial center line of the gas supply path and the partition wall in the double annular gas space is located at the middle point between two orifices adjacent to each other, orifices are not provided at the intersection, but the orifices are symmetrically arranged at regular intervals in both sides of the intersection. Therefore, the flow speed of the gas passing through the respective orifices becomes substantially uniform, so that the shield gas is blown out around the non-consumable electrode at a more uniform flow speed.

A fourth aspect of the present invention provides the non-consumable electrode welding torch according to claim 1, wherein an angle defined by an axial center line of the orifice and a plane of a wall portion of the torch body from which the non-consumable electrode is projecting outward is 0 to 60 degrees in an opposite direction to the projecting direction of the non-consumable electrode out of the torch body.

In the present invention according to claim 4, the shield gas introduced into the inner gas space is blown in the opposite direction to the gas outlet opening inside the inner gas space, to be thereby stirred before passing through the metal mesh plate installed in the inner gas space at the gas outlet opening. Therefore, a laminar shield gas flow of a uniform structure and flow speed can be formed as a whole. As a result, the welding torch enables performing high-quality welding even with a welding section in a narrow gap.

A fifth aspect of the present invention provides the non-consumable electrode welding torch according to claim 1, further comprising a ceramic plate attached to an entire wall portion of the torch body from which the non-consumable electrode is projecting outward, except the non-consumable electrode and the gas outlet opening.

In the present invention according to claim 5, the overall thickness of the torch can be reduced. Also, since the ceramic plate also serves as an insulator between the welding torch and the object to be welded, the arc can be prevented between the welding torch and the object to be welded at the time of high-frequency arc start, and the welding torch can be protected from the high radiant heat of the welding section.

A sixth aspect of the present invention provides the non-consumable electrode welding torch according to claim 1, wherein the torch body around the non-consumable electrode is extended so as to contact the metal mesh plate.

In the present invention according to claim 6, the torch body around the non-consumable electrode is extended so as to contact the metal mesh plate, and therefore the metal mesh plate is kept from directly contacting the non-consumable electrode, and thereby protected from being damaged by the heat of the arc.

A seventh aspect of the present invention provides the non-consumable electrode welding torch according to claim 1, wherein the inner gas space is of an annular shape, in which a sectional area becomes gradually smaller toward the gas outlet opening.

In the present invention according to claim 7, the shield gas blown through a plurality of orifices collide with each other inside the inner gas space thus to be evenly mixed, so that the flow speed of the gas blown through the orifices is completely lost and hence no longer directly affects the gas flow through the gas outlet opening. Also, since the sectional area in a portion of the inner gas space close to the gas outlet opening is smaller than the gas passage of other portions of the inner gas space, a part of the shield gas resides in the inner gas space, and resultantly the gas flow speed is leveled off before passing through the metal mesh plate and soon. Thus, since the shield gas passes through the metal mesh plate located at the bottom of the inner gas space in a uniform state achieved as above, a laminar shield gas flow of a uniform structure and flow speed can be formed as a whole, around the non-consumable electrode.

An eighth aspect of the present invention provides the non-consumable electrode welding torch according to claim 7, wherein the inner gas space is of an annular shape, in which an inner diameter thereof gradually becomes greater toward the gas outlet opening, while an outer diameter is constant.

In the present invention according to claim 8, the shield gas introduced into the inner gas space through the orifices tends to flow to a region where the inner diameter is smaller. Accordingly, the shield gas flows in the opposite direction to the gas outlet opening thus to be mixed, and then is blown out through the gas outlet opening, which is oriented in a different direction from the blowing direction of the orifices, in a uniform state around the non-consumable electrode.

A ninth aspect of the present invention provides the non-consumable electrode welding torch according to claim 1 or claim 8, further comprising a filter installed at the gas outlet opening.

In the present invention according to claim 9, the gas flow is made more uniform as a whole upon passing through the filter, and therefore a laminar shield gas flow of a uniform flow speed can be formed around the non-consumable electrode.

A tenth aspect of the present invention provides the non-consumable electrode welding torch according to claim 1, further comprising, inside the torch body, a gas supply unit that supplies the shield gas to the gas supply mechanism, a power supply unit that supplies power for welding to the non-consumable electrode, and a circulation path for a coolant.

In the present invention according to claim 10, since the shield gas supply unit, power supply unit and the coolant circulation path are provided inside the torch body, the shield gas supply unit and the coolant circulation path are completely sealed inside the torch body. Therefore, a trouble such as a gas leak can hardly be incurred and a higher cooling effect of the torch body can be achieved. Further, the torch becomes easier to handle.

An eleventh aspect of the present invention provides the non-consumable electrode welding torch according to claim 1, further comprising a cooling block including a gas supply unit that supplies the shield gas to the gas supply mechanism, a power supply unit that supplies power for welding to the non-consumable electrode, and a coolant circulation path, provided as a separate unit from the torch body, wherein the cooling block can be removably attached to the torch body.

In the present invention according to claim 11, since the torch body and the cooling block can be separated, a plurality of torch main bodies with a tungsten electrode adjusted in advance can be prepared in the case of TIG welding, so that the entire torch body can be replaced instead of adjusting or replacing the tungsten electrode on site, thus improving maintenance efficiency compared with the case where the coolant circulation path is included in the torch body.

A twelfth aspect of the present invention provides the non-consumable electrode welding torch according to claim 11, wherein the cooling block and the torch body are respectively provided with a joint portion to be joined via a planar contact, so that the cooling block and the torch body can be removably joined via the joint portion.

In the present invention according to claim 12, the torch body and the cooling block are joined via a planar contact, which assures the cooling effect of the torch body and the power supply to the torch body.

A thirteenth aspect of the present invention provides the non-consumable electrode welding torch according to claim 12, further comprising a cable through which the shield gas is supplied, connected to the gas supply unit in the cooling block, wherein the gas supply unit in the cooling block and the gas supply path connected to the outer gas space inside the torch body are connected via a planar contact at the joint portion with the torch body.

In the present invention according to claim 13, the shield gas can be easily supplied to the torch body, even when the cooling block is removed from the torch body.

A fourteenth aspect of the present invention provides the non-consumable electrode welding torch according to claim 12, wherein the joint portions of the cooling block and the torch body are joined with a ring-shaped fastener.

In the present invention according to claim 14, since the welding torch can be attached to or removed from the cooling block with a simple ring-shaped fastener without a screwing mechanism, the work efficiency for removing and attaching is significantly improved. In the case where foreign matter of a considerable size has intruded in the joint portion for planar contact, the operator instantly recognizes the abnormality since the ring-shaped fastener cannot be fitted. Also, in the case where the planar contact is not completely achieved even though the ring-shaped fastener is duly fitted, by some reason such as fine powder or the like being present at the joint portion, by which the cooling effect is degraded and thereby the temperature of the torch body gradually rises during the welding process, the ring-shaped fastener serves to press the torch body against the cooling block with the increase in temperature, because the thermal expansion of the torch body (made of a copper alloy in general) is greater than that of the fastener, so that the planar contact pressure increases to thereby restore the cooling effect via the contact interface, and thus the temperature of the torch can be lowered.

A fifteenth aspect of the present invention provides a non-consumable electrode welding head comprising a torch body module that includes the torch body, the non-consumable electrode and the gas supply mechanism of the non-consumable electrode welding torch according to claim 11; a torch mounting base module with the cooling block, on which the torch body module is fixed; a torch driving body module that integrally rotates the torch body module and the torch mounting module around an object to be welded; a torch driving mechanism module that supplies power to the torch driving body module; and a clamp mechanism module that supports the object to be welded; wherein the modules can be removably attached to the welding head in a mechanical manner.

In the present invention according to claim 15, the components constituting the non-consumable electrode welding head are classified by locations (such as the welding torch, retention and rotation unit for the object to be welded, driving unit, etc.) and assembled into an independent mechanism (module), such that each module can be easily attached or removed mechanically. Such a structure allows significantly improving the maintenance efficiency, and considerable reduction in the restoration period in the case of troubles. This system is particularly useful for minimizing degradation in maintenance efficiency due to adoption of an integral structure for securing rigidity of micronized components of the non-consumable electrode welding head, and in settling trouble in overseas installation sites where sufficient remedies cannot be taken in both aspects of software and hardware, since only the troubled module can be effectively inspected and repaired.

In particular, preparing in advance spare modules that include such components that are most likely to malfunction, and replacing and restoring only the module relevant to the troubled component once a trouble occurs, can significantly minimize the out-of-service period. Further, the troubled module can be disassembled for replacing the inner component that has failed, and then restored and prepared for a possible subsequent trouble.

BEST MODE FOR CARRYING OUT THE INVENTION

Hereunder, embodiments of the present invention will be described in further detail, referring to the associated drawings.

First Embodiment

Figure 1:
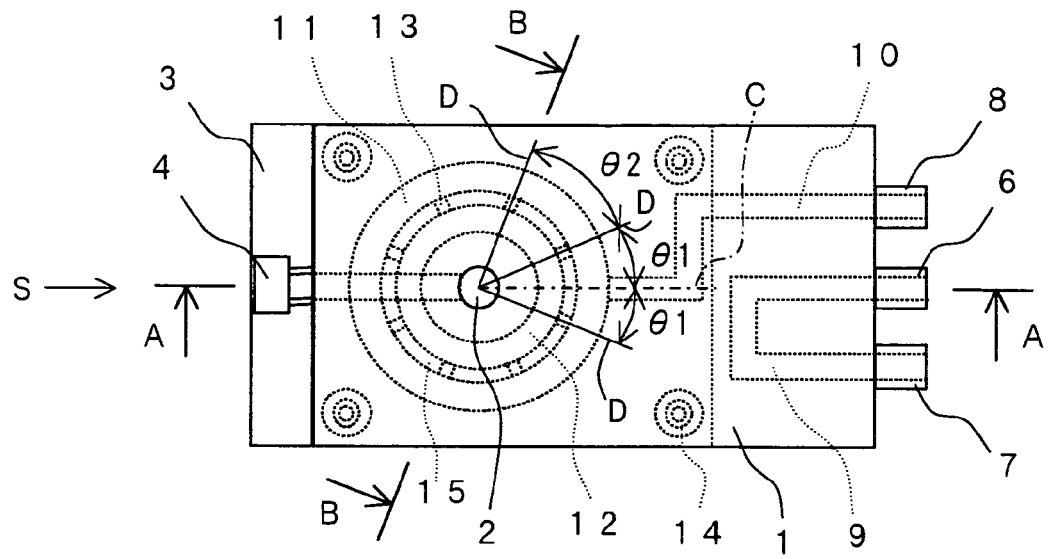
FIG. 1 is a plan view showing a non-consumable electrode welding torch according to a first embodiment of the present invention.
Figure 2:
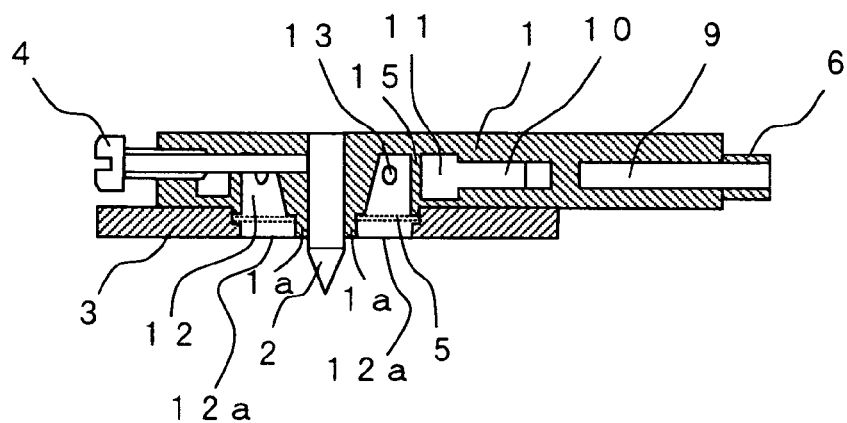
FIG. 2 is a cross-sectional view taken along the line A—A of the non-consumable electrode torch shown in FIG. 1.
Figure 3:
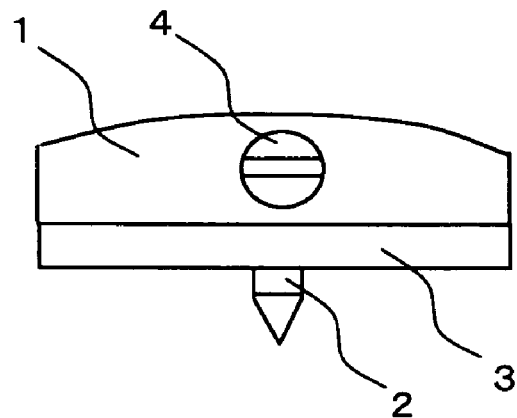
FIG. 3 is a side view from a direction indicated by S in FIG. 1 (a front view showing the non-consumable electrode welding torch according to an embodiment of the present invention)
Figure 4:
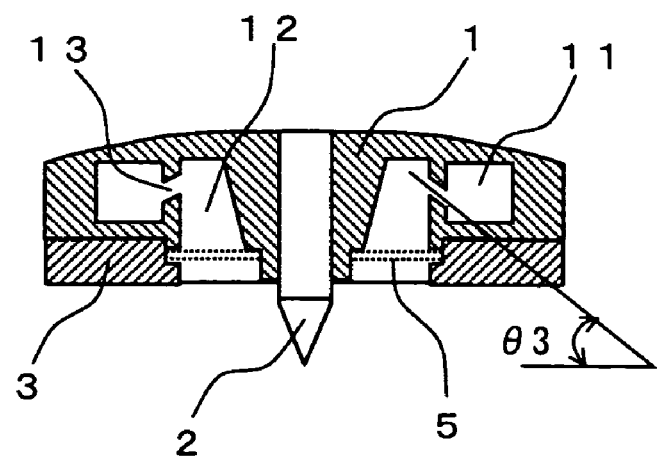
FIG. 4 is a cross-sectional view taken along the line B—B of the non-consumable electrode torch shown in FIG. 1.
Figure 10:
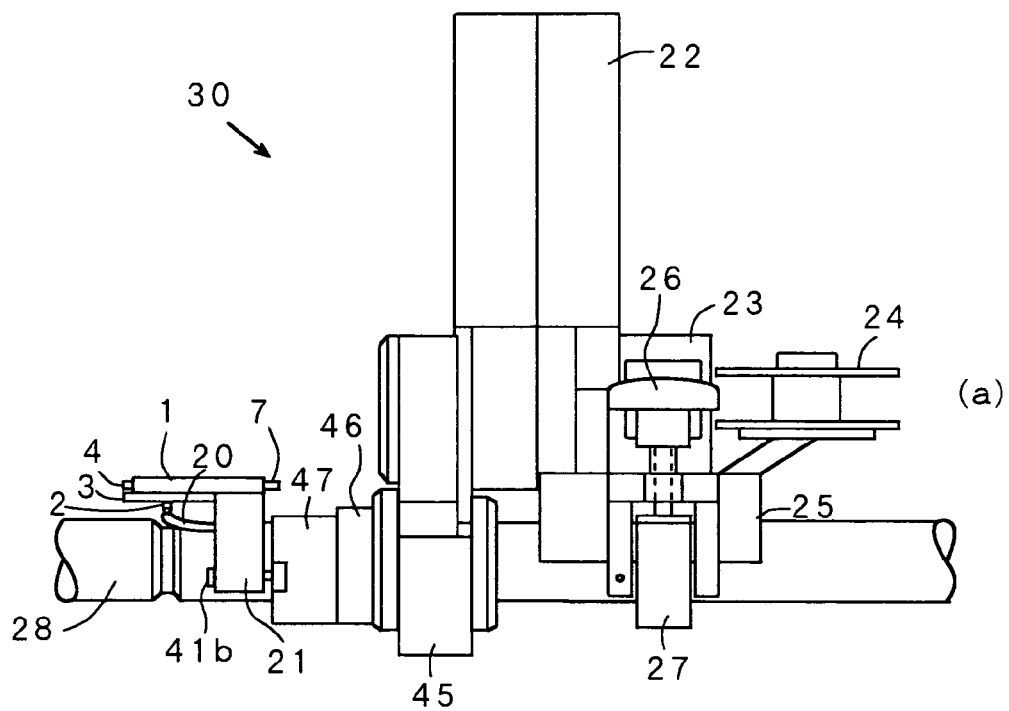
FIG. 10 is a side view showing an all-position welding head for tube butt-welding according to the respective embodiments of the present invention.
Figure 11:
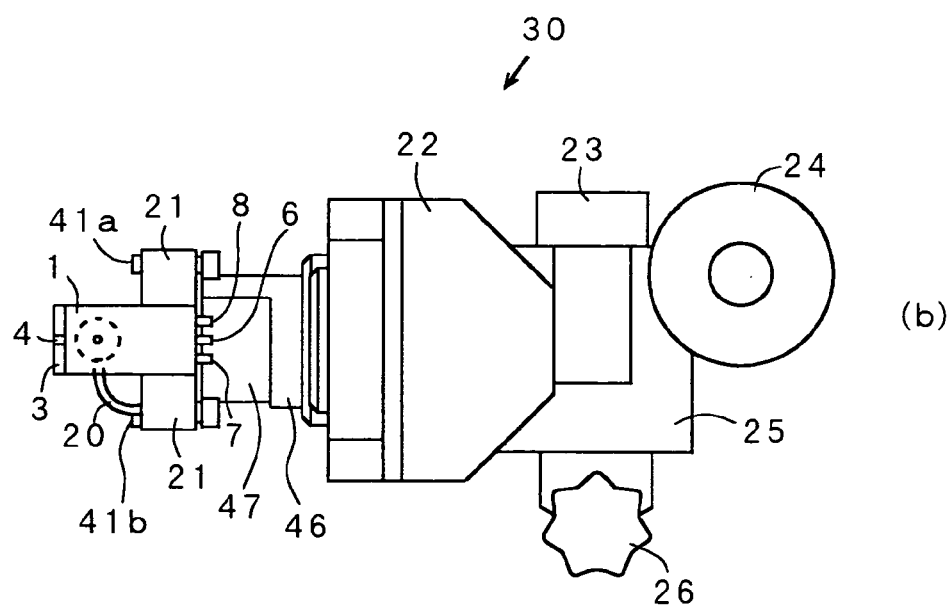
FIG. 11 is a plan view showing the all-position welding head for tube butt-welding of FIG. 10.
Figure 12:
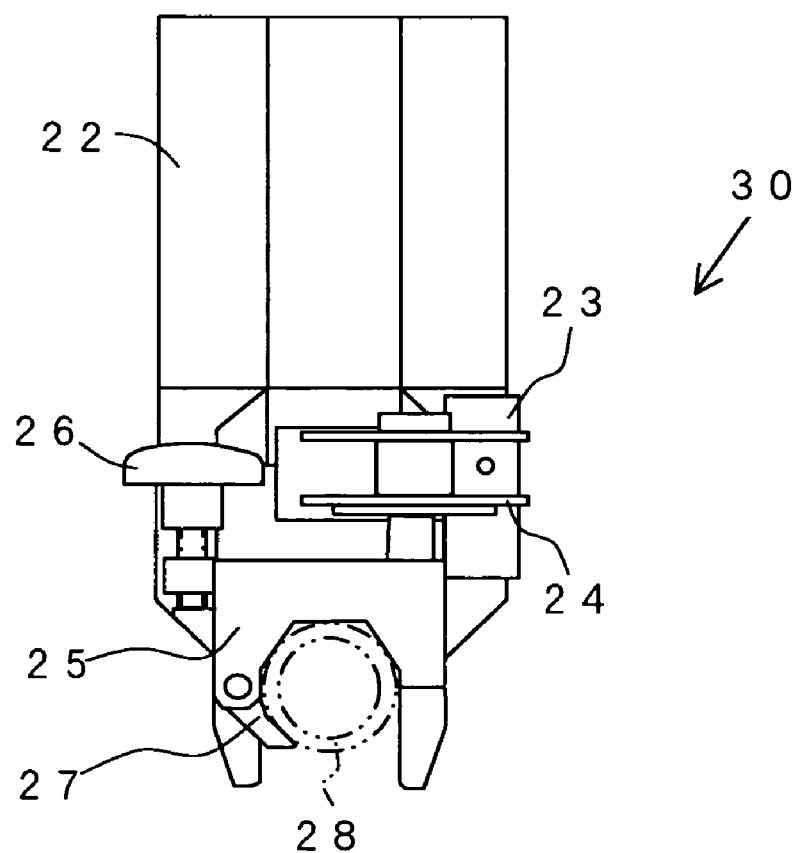
FIG. 12 is a rear view showing the all-position welding head for tube butt-welding of FIG. 10.

FIG. 10 is a side view showing an all-position welding head for butt-welding according to the embodiments of the present invention, and FIG. 11 is a plan view and FIG. 12 is a rear view showing the same. Also, FIG. 1 is a plan view showing the non-consumable electrode welding torch of the all-position welding head shown in FIGS. 10 to 12. FIG. 2 is across-sectional view taken along the line A—A of FIG. 1. FIG. 3 is a front view showing the non-consumable electrode welding torch according to an embodiment of the present invention. FIG. 4 is a cross-sectional view taken along the line B—B of FIG. 1.

A torch body 1 is of an ultra-flat shape with a thickness of approximately 5 mm, and the upper portion is formed in an arc shape so as to avoid interference with surrounding articles. Inside the torch body 1, a non-consumable electrode 2 projecting outward from the torch body is fixed with a fixing screw 4. The torch body 1 includes a water path 9, and joints 6 and 7 for a cooling power cable, which integrally includes a water path and a power supply cable, provided on a wall face opposing the wall face of the torch body 1 where the non-consumable electrode 2 is located, so as to form a cooling path through which a coolant is supplied into the cooling power cable joint 6, and is discharged through the cooling power cable joint 7 via the water path 9.

Also, a welding current is supplied from the cooling power cable joint 6 to the non-consumable electrode 2, via the torch body 1. Around the non-consumable electrode 2 in the torch body 1, a double gas space including an outer gas space 11 and an inner gas space 12 is provided, and a shield gas is supplied to the outer gas space 11 through a gas hose joint 8 and a gas supply path 10. Between the outer gas space 11 and the inner gas space 12 a partition wall 15 with a plurality of orifices 13 is provided, and the inner gas space 12 is open at a surface of the torch body 1 where the non-consumable electrode 2 is projecting outward. At the opening 12a of the inner gas space 12 a metal mesh plate 5 is placed, and is fixedly held between a ceramic plate 3 and a surface of the torch body 1. The ceramic plate 3 is of a size that covers the entire lower wall face of the torch body 1, except the positions corresponding to the non-consumable electrode 2, the gas outlet opening 12a and a mounting region for fixing the torch body 1 to a torch mounting base 21, and is attached to the lower face of the torch body 1. The ceramic plate 3 is secured to the torch body 1 with ceramic screws 14.

Referring to FIGS. 10 to 12, description will be given on an automatic circumferential multilayer welding for butted fixed piping performed with the torch body 1 constructed as above.

A welding head 30 is pressed against a piping 28 utilizing a clamp mechanism 25 as a guide, and the position of the welding head is adjusted such that the non-consumable electrode 2 of the torch body 1 is aligned with a beveled end 32 (FIG. 28), after which a hand knob 26 is manipulated so as to hold the piping 28 by a clamp lever 27, thus to fix the welding head 30 onto the piping 28. The non-consumable electrode 2 of the torch body 1 is caused to rotate in a circumferential direction of the piping 28, by a driving mechanism in the torch driving mechanism 22. Also, though not shown in the drawings, an additive wire wound on a wire reel 24 is supplied to the welding section by a wire feeding mechanism 23 through a wire nozzle 20.

An arc is generated between the tip of the non-consumable electrode 2 and the piping 28, and the non-consumable electrode 2 is caused to make one rotation around the piping 28 while feeding the wire to the welding section, so as to form a welded layer. In order to prevent the cables from being wound in two or more layers, the arc is stopped upon completing the welding of the entire circumference, and the non-consumable electrode 2 is reversely rotated around the piping 28, to return the non-consumable electrode 2 to the initial position. These steps are repeated several times, to complete the circumferential multilayer welding of the piping 28.

Figure 28:
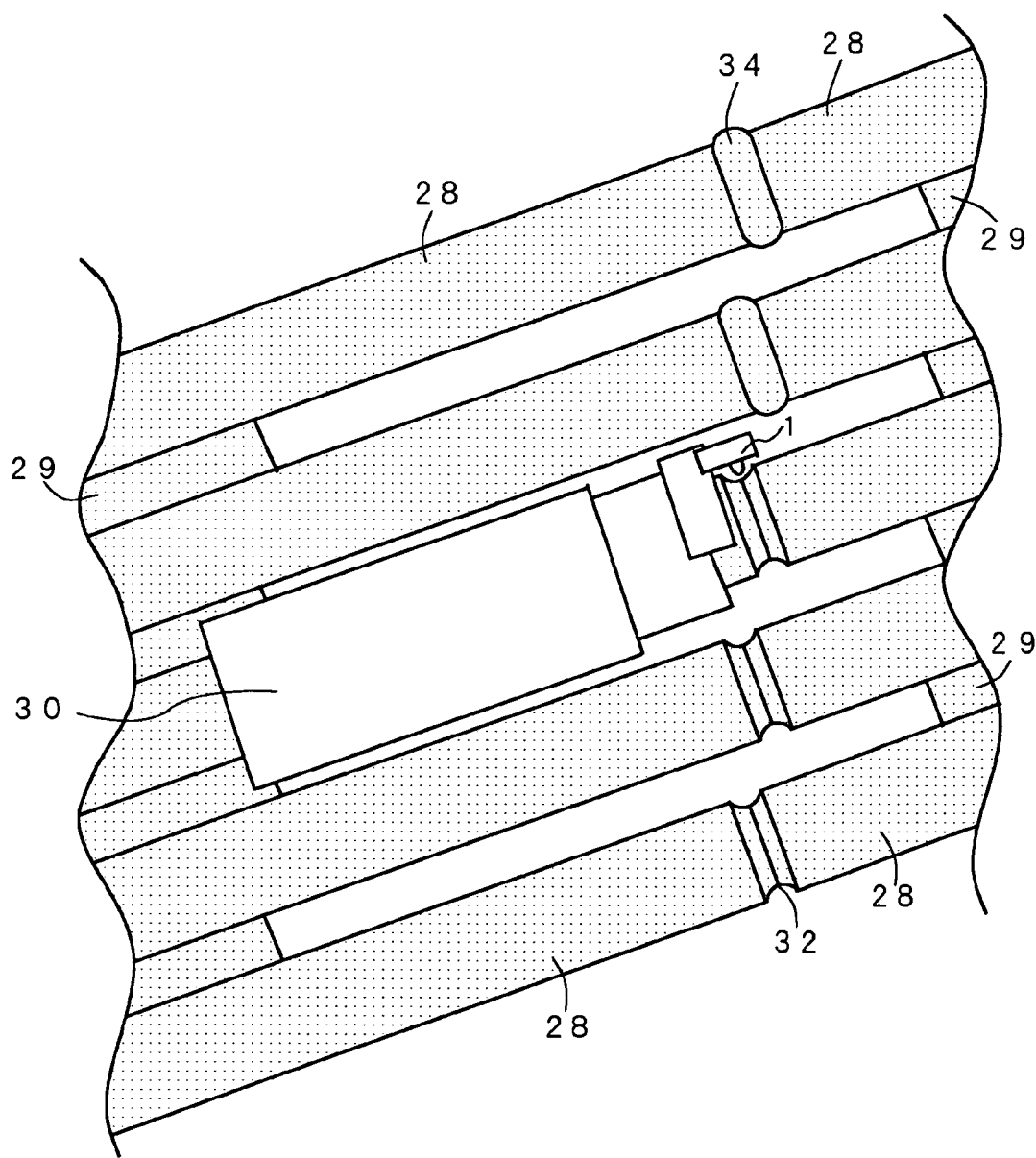
FIG. 28 is an illustration showing a state which a welding operation of a boiler furnace wall is performed with the non-consumable electrode welding torch according to the embodiments of the present invention.

A furnace wall of a boiler is, as shown in FIG. 28, constituted of a plurality of pipings 28 aligned in a plane and is connected to one another via a membrane bar 29, and includes butt-welded portions between the piping 28 and another piping 28. At the butt-welded portions, both pipings 28 undergo a bevelling processing, and the membrane bar 29 is not attached to the region close to the welding section for ease of the welding operation and hence a space is secured around the pipings 28 and 28. On such a boiler furnace wall, there are extremely narrow welding sections, where a spacing between the pipings 28 and 28 disposed parallel to each other is as narrow as approximately 17 mm. A welding torch to be employed in such a welding section would have to be of an ultra-flat shape with a thickness of approximately 7 mm, taking a projection length of the electrode and the moving margin for the torch into account.

As described above, the functions required for the welding torch are (1) retention of the electrode and power supply to the electrode, (2) cooling the electrode and (3) shielding the welding section with a gas. The non-consumable electrode 2 is pressed against the torch body 1 and is fixed with the fixing screw 4. This ensures the power supply from the torch body 1 to the non-consumable electrode 2. Also, the torch body 1 is directly cooled by the coolant, and hence the non-consumable electrode 2 can also be effectively cooled.

The gas shield of the welding portion has to be performed such that the gas blown out from the gas outlet opening 12a of the torch body 1 constitutes a laminar flow to enclose the entire welding section, for isolation from the air. However the welding torch is not thick enough to secure a sufficient length of the gas outlet, and therefore the gas shield of the welding section has been a very difficult issue.

In order to isolate the welding section from the ambient air when welding a piping, thus to obtain a stabilized arc and further high-quality welded metal, the shield gas flow blown out from the welding torch has to be a laminar flow of a uniform flow speed as a whole. It is a known technique to provide a gas lens such as a metal mesh plate at the gas outlet opening 12a of the welding torch, to form a laminar gas flow. However, since the metal mesh plate 5 is unable to completely rectify the uneven gas flow speed, the gas flow speed has to be made uniform before passing through the metal mesh plate 5.

The first embodiment will be described from the viewpoint of the gas flow.

First, the gas is supplied from outside of the torch body 1 to the outer gas space 11 in the double ring-shaped gas space, through the gas supply path 10. Then the gas is introduced to the inner gas space 12, through a plurality of orifices 13 having a circular sectional shape provided in the partition wall 15 located between the outer gas space 11 and the inner gas space 12. The partition wall 15 is of a ring shape with its center on the non-consumable electrode 2, and includes eight orifices 13 arranged at regular intervals. Here, the number of orifices 13 is not limited to eight.

In order to obtain the same gas flow speed through the respective orifices 13 which are of the same diameter, the gas pressure inside the outer gas space 11 has to be made greater than in the inner gas space 12 so that the orifices 13 may serve as a flow resistance. For such a purpose, the diameter of the orifices 13 has to be determined such that a total of the sectional area of the orifices 13, taken in a direction orthogonal to the axial center line (in a radial direction) of the orifices 13, becomes smaller than the sectional area of the gas supply path 10, taken in a direction orthogonal to the axial center line thereof.

Also, as shown in FIG. 1, the orifice 13 is not provided at the intersection of the center line C of the gas supply path passing through the center of the non-consumable electrode 2 and the partition wall 15, but the orifices 13 are symmetrically provided on both sides of this intersection.

Accordingly, when an angle defined by a line connecting the center line C of the gas supply path 10 and the center of the partition wall 15 (i.e. the center of the non-consumable electrode 2), and by a line D connecting the axial center line of the two orifices 13 and 13, symmetrically located on both sides of the intersection of the center line C of the gas supply path 10 and the partition wall 15, and the center of the partition wall 15 (i.e. the center of the non-consumable electrode 2) is designated by θ1, such an angle θ1 becomes 22.5 degrees when eight orifices 13 are provided in the partition wall 15.

Also, when an angle defined by the line D connecting the axial center line of one of the adjacent orifices 13 and 13, symmetrically located on both sides of the intersection of the center line C of the gas supply path 10 and the partition wall 15, and the center of the partition wall 15 (i.e. the center of the non-consumable electrode 2), and by another line D connecting the axial center line of the other of the symmetrically located orifices 13 and 13 and the center of the partition wall 15 (i.e. the center of the non-consumable electrode 2) is designated by θ2, such an angle θ2 becomes 45 degrees, while when six orifices 13 are provided the angle θ1 becomes 30 degrees and the angle θ2 becomes 60 degrees.

Further, as shown in FIG. 4, the orifice 13 is formed such that an angle θ3, defined by the axial center line of the orifice 13, provided on the partition wall 15 between the outer gas space 11 and the inner gas space 12, and by a flat portion of the wall face of the torch body 1 from which the non-consumable electrode 2 is projecting, falls in a range of 30 to 60 degrees. Under such a structure, the gas introduced through the gas supply path 10 is blown from the outer gas space 11 into the inner gas space 12, in a direction opposite the opening 12a in the inner gas space 12, and is therefore stirred inside the inner gas space 12 before passing through the metal mesh plate 5 installed at the opening 12a of the inner gas space 12. Therefore, the gas flow speed becomes uniform, and a generally uniform laminar gas flow can be formed.

The metal mesh plate 5 is held between the ceramic plate 3 and a ceramic plate positioning projection surface on the torch body 1, thus to be fixed to the torch body 1. Such a design enables constructing of the entire torch body 1 in a thickness of approximately 7 mm, and when the ceramic plate 3 is formed in a thickness of approximately 2 mm, the torch body 1 is formed in a thickness of approximately 5 mm. Also, since the metal mesh plate 5 is fitted in the projection 1a (FIG. 2) on the wall of the torch body 1 through which the non-consumable electrode 2 is inserted and retained, the metal mesh plate 5 is kept from directly contacting the non-consumable electrode 2. Therefore, the metal mesh plate 5 can be protected from being damaged by the heat of the arc.

Since the ceramic plate 3 also serves as insulation between the welding torch and the object to be welded, the arc can be prevented between the welding torch and the object to be welded at the time of high-frequency arc start, and the ceramic plate 3 also protects the welding torch from the high radiant heat of the welding section. The temperature of the ceramic plate 3 may rise up to 500° C., and therefore the ceramic plate 3 is fixed to the torch body 1 with ceramic screws 14, so that the metal mesh plate 5 can be replaced.

Second Embodiment

A second embodiment of the non-consumable electrode welding torch, which is a variation of the first embodiment, will be described based on the cross-sectional view shown in FIG. 5 taken along the line A—A of FIG. 1, and the cross-sectional view shown in FIG. 6 taken along the line B—B of FIG. 1.

Figure 5:
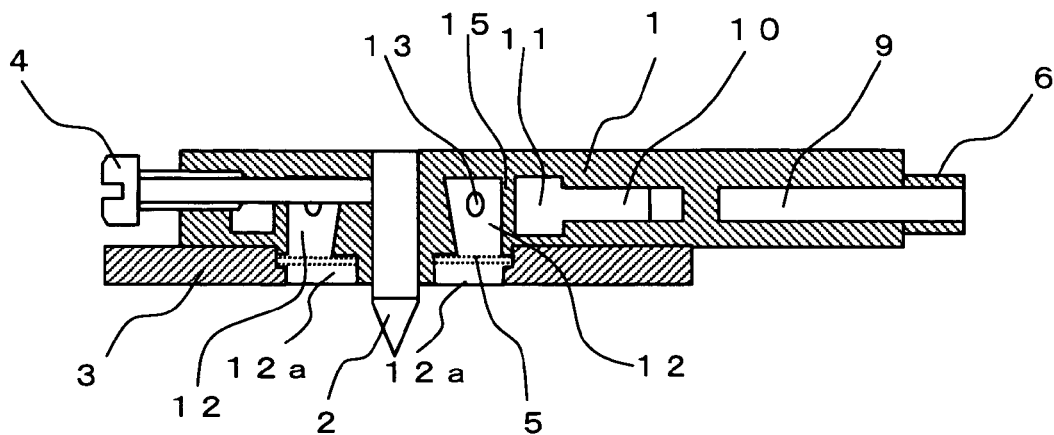
FIG. 5 is a cross-sectional view showing a non-consumable electrode welding torch according to a second embodiment of the present invention, taken along a line corresponding to A—A of FIG. 1.

A feature of this embodiment lies in that, as shown in FIG. 5, the inner gas space 12 in the torch body 1 is narrower at a level closer to the gas outlet opening 12a. Accordingly, the gas blown out through the orifice 13 hits a wall face of the inner gas space 12 and then splits into two opposite circumferential directions along the wall, at which point the gas collides with the gas that has been likewise blown out through the adjacent orifice 13 and is mixed therewith, and thus the initial flow speed of the gas blown out of the orifice 13 is completely lost. Additionally, since the gas introduced into the inner gas space 12 through the respective orifices 13 tends to flow toward a larger space (opposite the gas outlet opening 12a), the gas flows opposite the gas outlet opening 12a thus to be mixed with other gas flows, and is then blown out in a uniform state toward around the non-consumable electrode through the gas outlet opening 12a. Further, since the sectional area (area of a plane parallel to the wall face of the torch body 1 from which the non-consumable electrode 2 is projecting) of the inner gas space at the level of the gas outlet opening 12a is the smallest in the inner gas space 12, a portion of the gas resides inside the inner gas space 12, thus making the gas flow speed more uniform before passing through the metal mesh plate 5. Thereafter, since the gas passes through the metal mesh plate 5 located at the bottom of the inner gas space 12, a laminar shield gas flow of a uniform structure and flow speed can be formed as a whole.

Third Embodiment

A third embodiment of the non-consumable electrode welding torch, which is a variation of the second embodiment, will be described based on the cross-sectional view of the non-consumable electrode welding torch shown in FIG. 7.

For the description of this embodiment, the same constituents or structure as those shown in FIG. 1 are provided with the same numerals, and description thereof will be omitted.

The torch body 1 around the electrode is formed in a column shape, and a filter 16 is located at the gas outlet opening 12a. For example, a sintered nonwoven cloth filter formed of a laminated stainless steel metal fiber felt (such as Fuji metal fiber manufactured by Fuji Filter MFG. Co., Ltd.) may be suitably employed as the filter 16. Another example of the filter is a mesh-type porous material formed of a metal wire such as a stainless steel (for example SUS347), Inconell, nickel, Hastelloy, Carpenter or Nichrome, formed in a mesh and stacked in several layers, with the wire intersections sintered (such as Fujiloy filter element manufactured by Fuji Filter MFG. Co., Ltd.). Adjusting the wire diameter, wire pitch and number of layers of the porous material allows effectively controlling the transmission of the shield gas through the filter. Further, a porous material of a sintered powder of metal (for example SMC sintered metal element) such as a stainless steel, bronze, Inconell, nickel, Hastelloy, Carpenter or Nichrome, or a sintered ceramic porous material may be employed as the filter 16. When employing such a porous material as the filter 16, adjusting the particle diameter and particle distribution of the powder, and sintering conditions such as pressure or heating time allows effectively controlling the shield gas transmission through the filter.

The filter 16 disposed at the gas outlet opening 12a serves as a resistance against the gas flow so as to retain the gas introduced through the orifice 13 inside the inner gas space 12, thereby making the gas flow speed more uniform before passing through the filter 16. The filter 16 can also form a laminar flow of the gas as the metal mesh plate, and therefore the gas that has passed through the filter 16 can be formed into a laminar flow of a uniform structure and flow speed as a whole.

Accordingly, such an arrangement also provides a similar advantage to that of the second embodiment.

Figure 6:
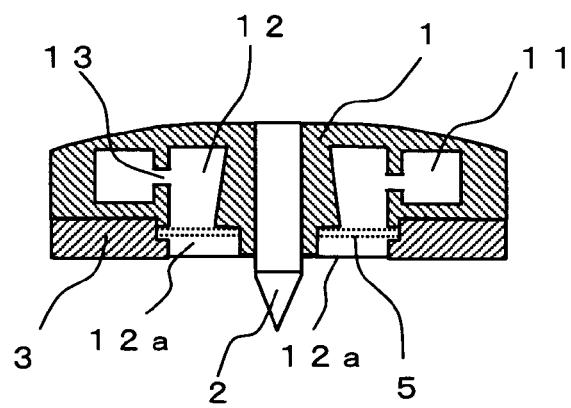
FIG. 6 is a cross-sectional view showing a non-consumable electrode welding torch according to the second embodiment, taken along a line corresponding to B—B of FIG. 1.
Figure 7:
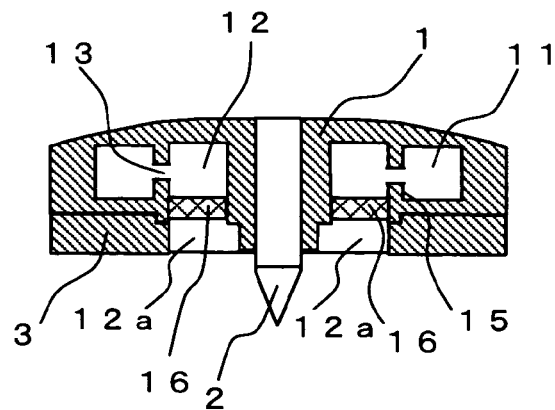
FIG. 7 is a cross-sectional view showing a non-consumable electrode welding torch according to a third embodiment of the present invention.

In addition, the orifices 13 shown in FIGS. 6 and 7 may be formed such that the angle θ3, defined by the axial center line of the orifice 13 provided in the partition wall 15 between the outer gas space 11 and the inner gas space 12 and the plane of the wall portion of the torch body 1 from which the non-consumable electrode is projecting, becomes 0 to 60 degrees as shown in FIG. 4.

Fourth and Fifth Embodiment

A fourth and fifth embodiments of the non-consumable electrode welding torch, which are a variation of the first embodiment, will be described based on the plan view of the non-consumable electrode welding torch shown in FIG. 8, and the plan view of the non-consumable electrode welding torch shown in FIG. 9, respectively. For the description of this embodiment, the same constituents or structure as those shown in FIG. 1 are given the same numerals, and description thereof will be omitted.

Figure 8:
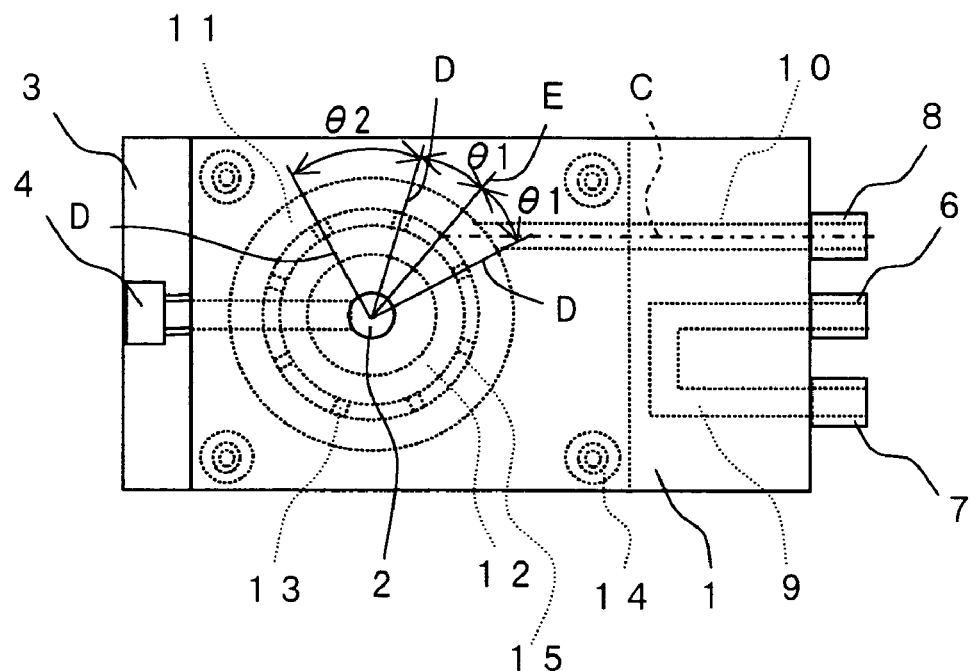
FIG. 8 is a plan view showing a non-consumable electrode welding torch according to a fourth embodiment of the present invention.
Figure 9:
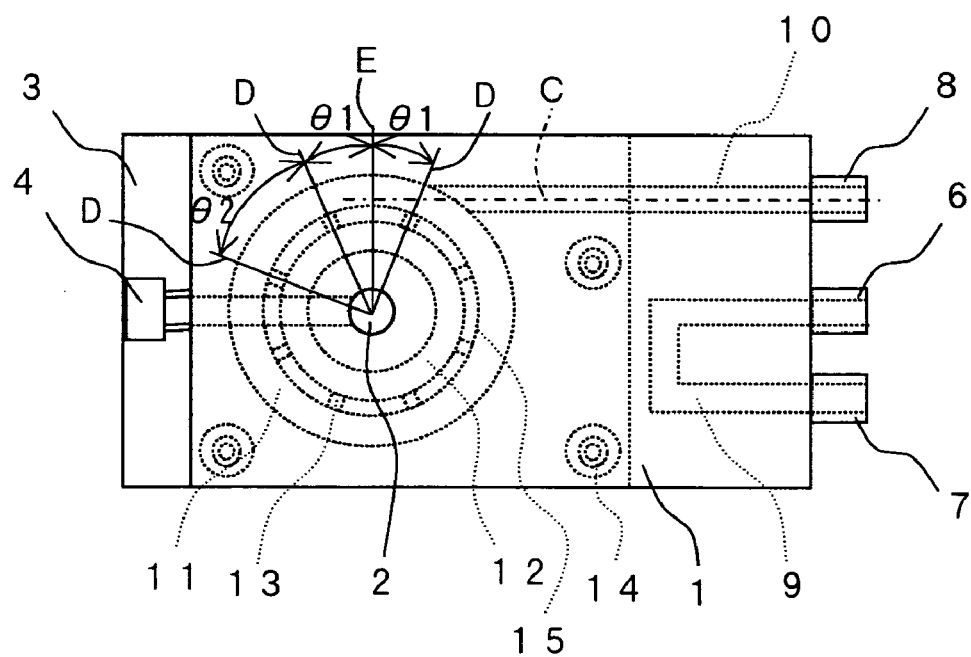
FIG. 9 is a plan view showing a non-consumable electrode welding torch according to a fifth embodiment of the present invention.

While an extension of the center line C of the gas supply path 10 falls on the center of the partition wall 15 (center of the non-consumable electrode 2) in the first embodiment shown in FIG. 1, the extension of the center line C of the gas supply path 10 does not pass on the center of the non-consumable electrode 2 in the embodiments shown in FIGS. 8 and 9.

According to the fourth embodiment shown in FIG. 8, the orifice is not provided on the line E, which connects the intersection of the center line C of the gas supply path 10 and the outer wall face of the partition wall 15 in the double ring-shaped gas spaces 11 and 12 and the center of the non-consumable electrode 2, but a pair of orifices 13 is symmetrically provided on both sides of the above intersection. When eight orifices 13 are provided at regular intervals in the partition wall 15, the angle θ1, defined by the line E connecting the intersection of the center line C of the gas supply path 10 and the partition wall 15 and the center of the non-consumable electrode 2, and by the line D connecting the axial center line of the symmetrically located two orifices 13 and 13, and the center of the non-consumable electrode 2, becomes 22.5 degrees, and the angle θ2 between two lines D, each connecting the axial center line of the adjacent orifices 13 and 13 and the center of the partition wall 15 (i.e. the center of the non-consumable electrode 2) becomes 45 degrees.

Such an arrangement provides a similar advantage to that of the first embodiment.

According to the fifth embodiment shown in FIG. 9, the orifice is not provided on the intersection of the center line C of the gas supply path 10 and the partition wall 15 between the outer gas space 11 and the inner gas space 12, but a pair of orifices 13 is symmetrically provided on both sides of such an intersection.

In this case, the angle θ1, defined by the line E connecting the intersection of the center line C of the gas supply path 10 and the partition wall 15 and the center of the non-consumable electrode 2, and by a line D connecting either of the axial center lines of the symmetrically located two orifices 13 and 13 and the center of the non-consumable electrode 2, becomes 22.5 degrees when eight orifices 13 are provided on the partition wall 15.

Such an arrangement provides a similar advantage to that of the first embodiment.

Sixth Embodiment

Figure 13:
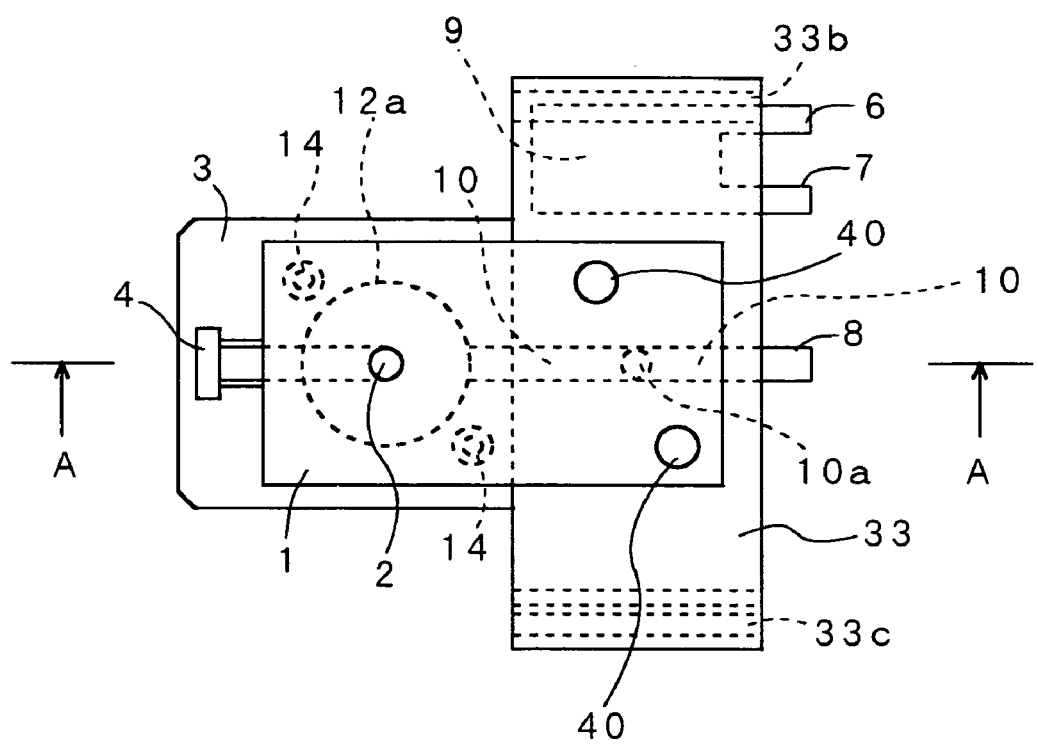
FIG. 13 is a plan view showing a non-consumable electrode welding torch body, where a cooling block that indirectly cools the torch body is separated from the torch body according to an embodiment of the present invention.
Figure 14:
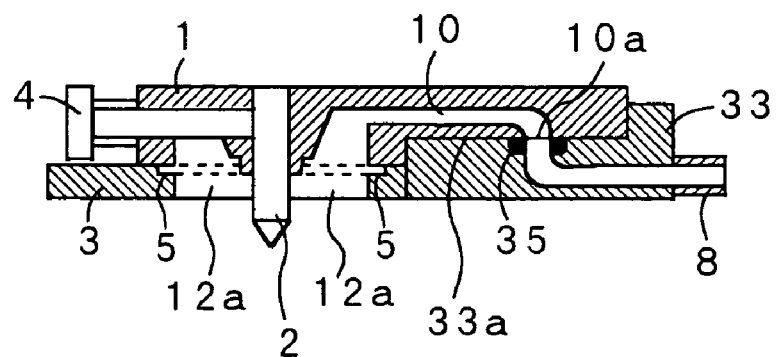
FIG. 14 is a cross-sectional view taken along the line A—A of FIG. 13.
Figure 15:
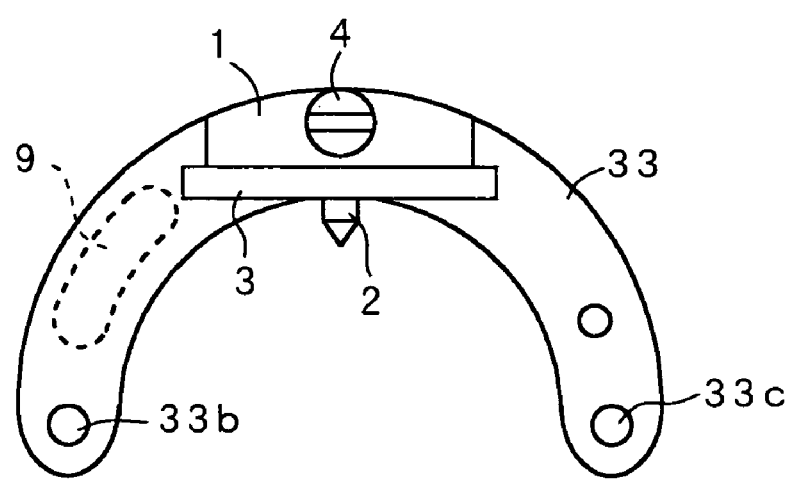
FIG. 15 is a front view showing the non-consumable electrode welding torch of FIG. 13 and the cooling block.
Figure 16:
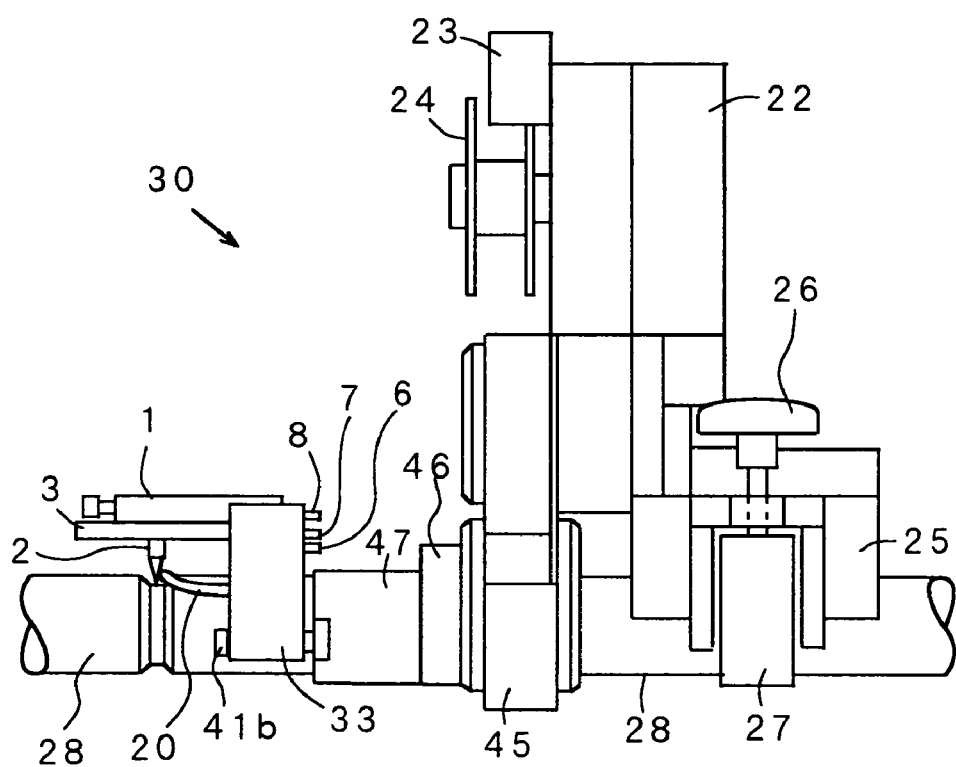
FIG. 16 is a side view showing a welding head with the welding torch of FIG. 13 mounted thereon.
Figure 17:
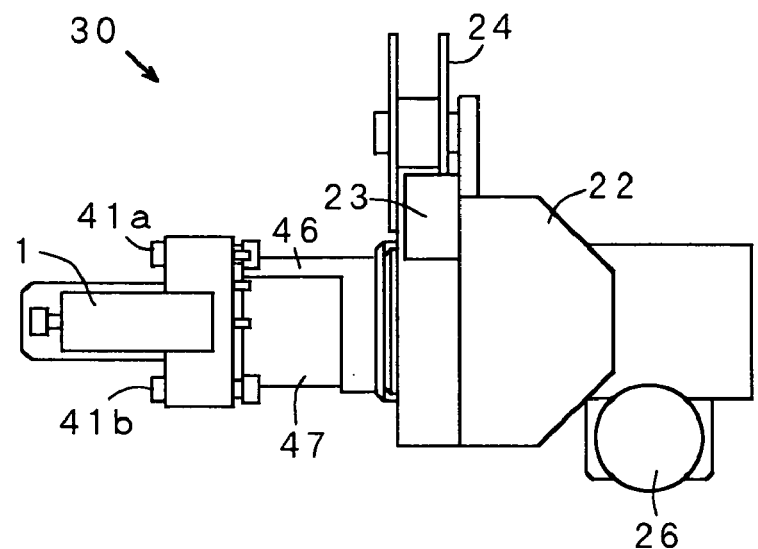
FIG. 17 is a plan view showing a welding head with the welding torch of FIG. 13 mounted thereon.
Figure 18:
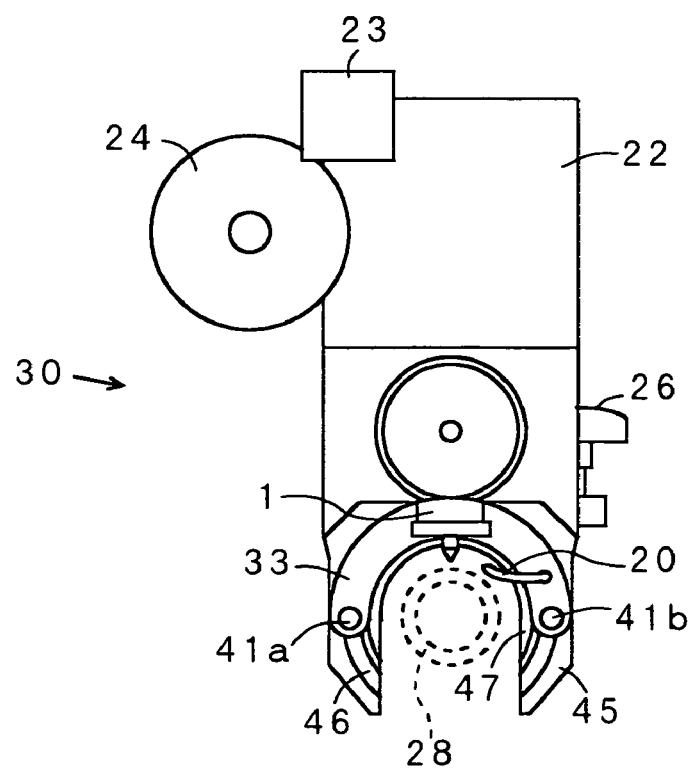
FIG. 18 is a front view showing a welding head with the welding torch of FIG. 13 mounted thereon.

FIG. 13 is a plan view showing a non-consumable electrode welding torch body, separated from a component that indirectly cools the torch body (hereinafter, cooling block 33) according to this embodiment. FIG. 14 is a cross-sectional view taken along the line A—A of FIG. 13. FIG. 15 is a front view showing the non-consumable electrode welding torch of FIG. 13. FIG. 16 is a side view showing a welding head with the welding torch of FIG. 13 mounted thereon, while FIG. 17 is a plan view and FIG. 18 is a front view of the same.

The torch body 1 is of an ultra-flat shape with a thickness of approximately 5 mm and the upper portion is formed in an arc shape, as in the first embodiment. Other constituents that have the same function as those in the first embodiment are given the same numerals, and description thereof will be omitted.

The torch body 1 and the cooling block 33 include the gas supply path 10, so that the shield gas introduced through the gas hose joint 8 is supplied to the torch body 1 via the gas supply path joint 10a. The gas supply path joint 10a is provided with an O-ring 35 for prevention of gas leaks.

The gas supplied to the torch body 1 is then supplied to the welding section such as the piping 28 (FIG. 16) through the gas outlet opening 12a in the torch body 1, and the gas outlet opening 12a is provided with a gas lens such as the metal mesh plate 5 for regulating the gas flow, which is held between the ceramic plate 3 and the torch body 1.

The ceramic plate 3 covers the entire lower wall face of the torch body 1, except the positions corresponding to the non-consumable electrode 2, the gas outlet opening 12a and an interface 33a for the cooling block 33. The ceramic plate 3 is fixed to the torch body 1 with ceramic screws 14. The cooling block 33 includes a coolant path 9, so that the coolant introduced through the cooling power cable joint 6 is discharged through the cooling power cable joint 7. The cooling of the torch body 1 is indirectly performed via the interface 33a for the cooling block 33.

On the other hand, the welding current is supplied into the cooling block 33, which serves as a conductor, through the joint 6 for the cooling power cable with a power cable and a coolant path, and then to the torch body 1 through the interface 33a. The torch body 1 is fixed to the cooling block 33 with welding torch fixing screws 40.

Also, the cooling block 33 includes screw inlets 33b and 33c (FIG. 13) through which fixing screws 41a and 41b for connecting the cooling block 33 to rings 46 and 47 are provided. The cooling block 33 also serves as the torch mounting base 21 shown in FIG. 10.

The torch body 1 according to this embodiment is mounted on a welding head 30 for performing the automatic circumferential multilayer welding as shown in FIGS. 16 to 18. When performing the automatic circumferential multilayer welding, first the welding head 30 is pressed to the piping 28 utilizing a clamp mechanism 25 (FIG. 16) as a guide. Then the position of the welding head is adjusted such that the non-consumable electrode 2 of the torch body 1 is aligned with the beveled end 32 of the piping 28, after which a hand knob 26 is manipulated so as to hold the piping 28 by a clamp lever 27 of the clamp mechanism 25, thus to fix the welding head 30 onto the piping 28. The non-consumable electrode 2 of the welding torch 1 is caused to rotate in a circumferential direction of the piping 28, by a driving mechanism in the torch driving mechanism 22. Also, though this is not shown, an additive wire wound on the wire reel 24 is supplied to the welding section by a wire feeding mechanism 23 through the wire nozzle 20.

For welding, an arc is generated between the tip of the non-consumable electrode 2 and the piping 28, and the non-consumable electrode 2 is caused to make one rotation around the piping 28 while feeding the weld wire (not shown) to the welding section, so as to form a welded layer. In order to prevent the cables from being wound in two or more layers, these steps are repeated several times, to complete the circumferential multilayer welding of the piping 28.

As described above, the non-consumable electrode 2 is frequently adjusted or replaced during the welding operation. In the case of the micronized ultra-flat welding torch, the length of the non-consumable electrode 2 is only approximately 10 mm and hence in the actual working site, especially at a local installation site of the welded products, such components are often dropped or lost thus causing considerable degradation in working efficiency. However, this can be prevented by upsizing the unit of the components to be replaced.

To be more detailed, though each component of the welding torch such as the non-consumable electrode 2, ceramic plate 3 or fixing screws 4 are micronized, the torch body 1 may be made easily attachable to and removable from the welding head 30, instead of replacing each single component independently, so as to replace the entire welding torch including the torch body 1, non-consumable electrode 2, ceramic plate 3, fixing screws 4 and so forth.

In order to make the torch body 1 easily attachable to and removable from the welding head 30, cables and hoses through which the welding current, welding section protecting gas and coolant for cooling the welding torch are supplied have to be connected to a position other than the torch body 1, and hence the cooling block 33, to which the torch body 1 is attached, is provided with the cooling power cable joints 6 and 7 and the gas hose joints 8. The gas introduced into the cooling block 33 is supplied to the torch body 1 through the gas supply path 10 and via the gas supply path joint 10a. The gas supply path joint 10a is provided with the O-ring 35 for preventing gas leaks.

The welding current is supplied to the non-consumable electrode 2 via the interface 33a for the cooling block 33, utilizing the material of the torch body 1 and the cooling block 33 as the conductor. Since the torch body 1 is removable from the cooling block 33, it would be difficult to completely seal a coolant joint if the coolant joint is provided on the interface 33a for the cooling block 33. Accordingly, the coolant path 9 is made to circulate only within the cooling block 33, so as to indirectly cool the torch body 1.

Such a structure enables easy attachment and removal of the welding torch 1 to and from the welding head 30, and also achieves a welding torch 1 that ensures the supply of the welding current, gas and cooling effect, and provides excellent working and maintenance efficiency for the welding operation.

Seventh Embodiment

Figure 19:
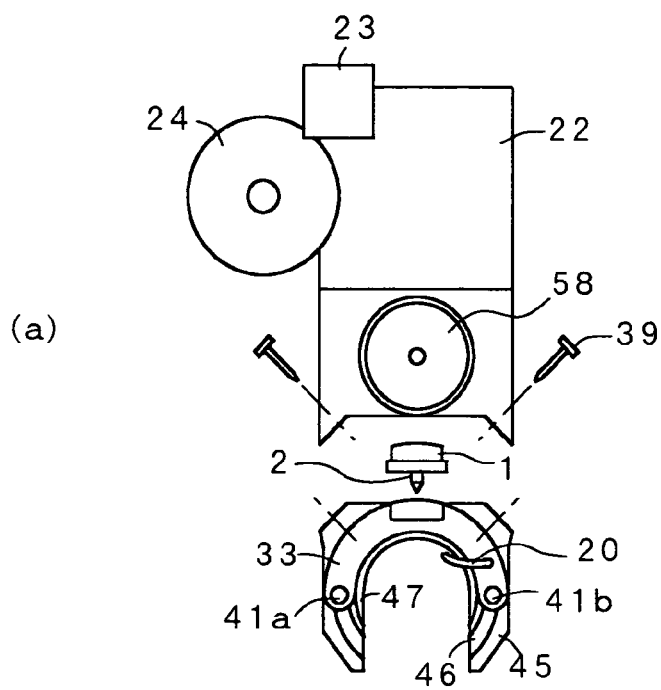
FIG. 19(a) is an exploded front view.
FIG. 19(b) is an exploded side view showing a welding head including a split structure according to an embodiment of the present invention.
Figure 19:
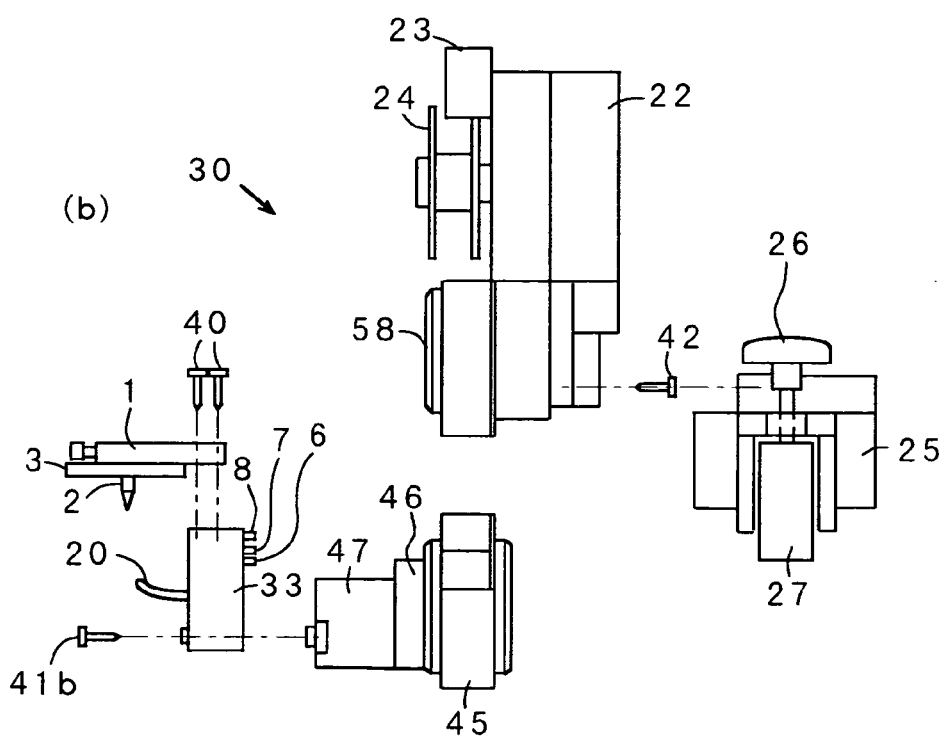
Figure 20:
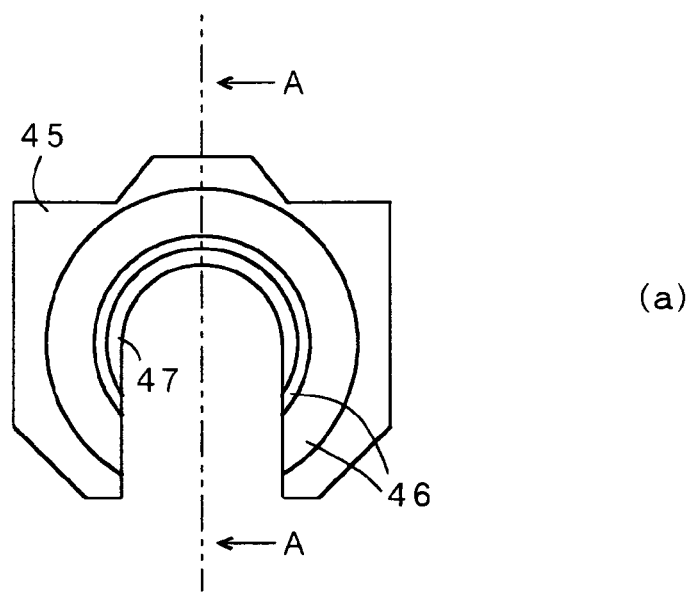
FIG. 20(a) is a front view showing a torch driving body module of the welding head of FIG. 19.
FIG. 20(b) is a cross-sectional view taken along the line A—A of FIG. 20(a)
Figure 20:
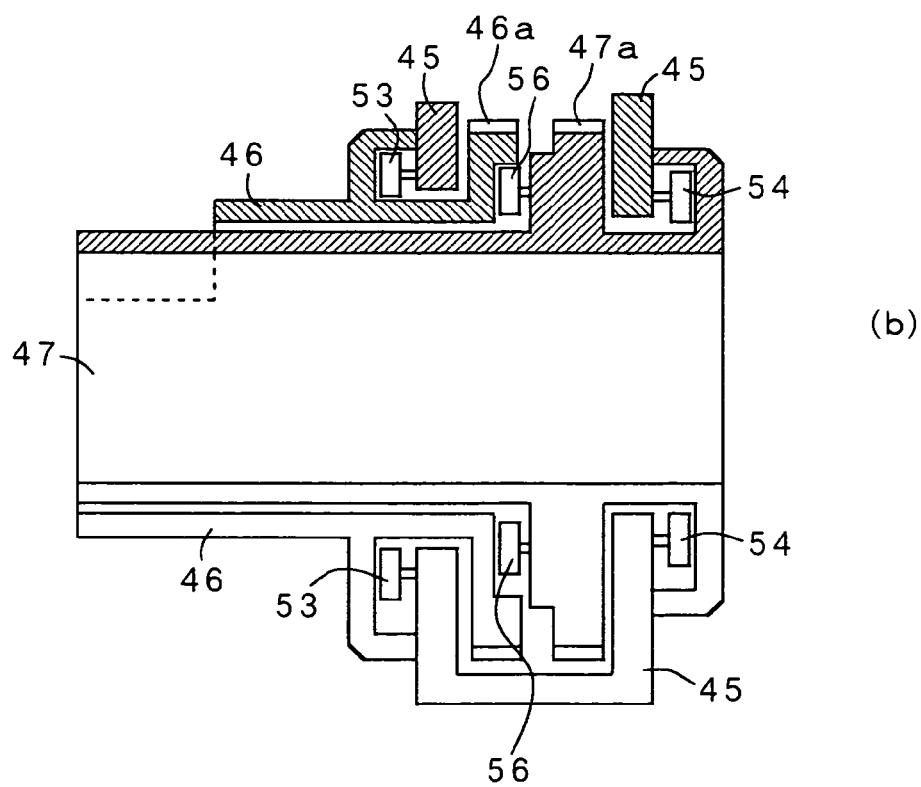
Figure 21:
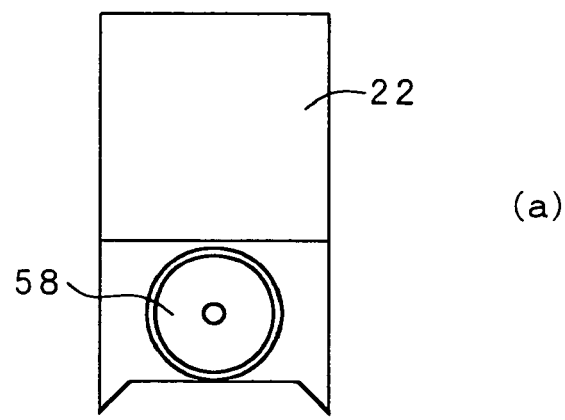
FIG. 21(a) is a front view.
FIG. 21(b) is a side view and FIG. 21(c) is a cross-sectional view taken along the line B—B of FIG. 21(b), respectively showing details of the torch driving mechanism module of the welding head of FIG. 19.
Figure 21:
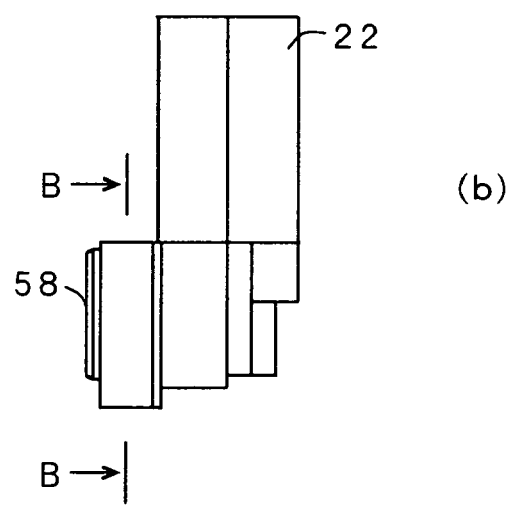
Figure 21:
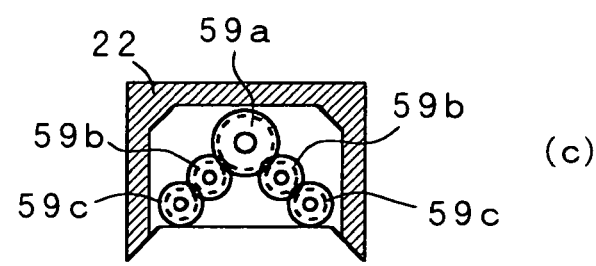

A seventh embodiment shown in FIGS. 19 to 21 represents the non-consumable electrode automatic welding head 30 shown in FIGS. 16 to 18 divided into separable modules.

FIG. 19(*a*) is an exploded front view of the welding head shown in FIGS. 16 to 18, and FIG. 19(*b*) is an exploded side view thereof. FIG. 20(*a*) is a front view showing details of a torch driving body module 45, and FIG. 20(*b*) is a cross-sectional view taken along the line A—A of FIG. 20(*a*). FIG. 21(*a*) is a front view, FIG. 21(*b*) is a side view and FIG. 21(*c*) is a cross-sectional view taken along the line B—B of FIG. 21(*b*), respectively showing details of the torch driving mechanism module 22. Other constituents that have the same function as those in the first embodiment are given the same numerals, and description thereof will be omitted.

The welding head 30 includes a module of the torch body 1, module of the cooling block 33 (serving also as the torch mounting base), module of the torch driving body 45, module of the torch driving mechanism 22 and the clamp module 25, each of which can be mechanically attached to one another with fixing screws 39 to 42. The torch driving mechanism 22 and the torch driving body 45 are assembled with the fixing screw 39 (FIG. 19(*a*)).

The clamp mechanism 25 module including the clamp mechanism 25, clamp lever 27 and hand knob 26 and so on serves to hold the piping 28, and as shown in FIG. 20 a cylindrical torch rotating ring 46 of a cylindrical shape with C-shaped cross section to be loosely fitted on the piping 28, and a torch moving ring 47 that moves the torch upward and downward, are concentrically attached to the torch driving body 45. Here, the ring 46 is overlaid on the ring 47 so as to rotate with respect to each other. Accordingly, the piping 28 held by the clamp mechanism (the clamp mechanism 25, clamp lever 27 and hand knob 26 and so on) is loosely inserted through the torch moving ring 47.

The torch rotating ring 46 and the torch moving ring 47 are accommodated in a lower open space of the torch driving body 45 so as to be loosely retained as shown in FIG. 20(*b*). The rings 46 and 47 are also rotatably retained by the body 45 via a bearing 53 and 54 respectively, and a bearing 56 is provided between the ring 46 and the ring 47.

Under such a structure, the rotating ring 46 and the torch moving ring 47 can independently rotate around the axial center with respect to each other by the respective driving motors (not shown), without falling off in the axial direction.

Also, an end portion of the cooling block 33 (serving also as the torch mounting base), of a bent shape in a front view, to which the torch body 1 with the non-consumable electrode 2 is attached, is connected to the ring 46 with the fixing screw 41a, and the other end portion is connected to the ring 47 with the screw 41b. Accordingly, adjusting the rotating stroke of the rings 46 and 47 allows adjusting a spacing between the tip of the non-consumable electrode 2 and the piping 28 when the non-consumable electrode 2 rotates along the outer circumference of the piping 28, thereby allowing overlay welding on the beveled end 32 of the piping 28.

Further, the torch driving mechanism 22 includes a gear mechanism (not shown) for driving the rotating ring 46 and the torch moving ring 47. Also, a cover 58 is provided at a forward position of the gear mechanism to cover an opening of the driving mechanism 22. In addition, the torch driving mechanism 22 includes, inside an upper portion thereof, a torch rotating motor and a torch moving motor (not shown) that provide the driving force of the gear mechanism.

When the torch moving ring 47 is caused to rotate by the driving mechanism to be described later, the cooling block 33 with an end portion retained by the ring 47 with the fixing screw 41b pivotally swings around the fixing screw 41a or 41b. Such a swinging motion of the cooling block 33 around the fixing screw 41a or 41b causes a variation in the spacing between the non-consumable electrode 2 of the torch body 1 and the surface of the piping 28, thus allowing adjustment for an appropriate welding arc length.

Referring to FIG. 20(*b*), the rotating ring 46 and the torch moving ring 47 are provided with gear wheels 46a and 47a along the outer circumference thereof, which are driven by a driving force of the respective rotating motors in the module of the torch driving mechanism 22 via a plurality of spur gears. From FIG. 21C, it is to be understood how the driving force of the torch rotating motor (not shown) is transmitted to the torch rotating ring 46 via a plurality of spur gears 59a, 59b and 59c one after another.

With regard to the automatic welding head 30 that performs the circumferential multilayer welding for the piping 28 of a boiler shown in FIG. 28, adjustment and replacement of the non-consumable electrode 2, as well as replacement of the wire nozzle 20 due to wear have to be carried out, as a part of the regular maintenance work. In addition, wear of the gears and bearings due to a long period of use, damage of driving components due to intrusion of foreign matter, and also a strong impact imposed on the automatic welding head 30 because of dropping off at an installation site may be cited as causes of possible malfunctions.

In particular, the module of the torch driving body 45 and of the torch driving mechanism 22 includes numerous gears and small bearings for transmission of the driving force, and these components are constantly subjected to a load during the welding operation, and are hence prone to malfunction even during regular use. Besides, these modules include a great number of parts and a complicated structure, from which it is apparent that once a trouble occurs it is difficult to quickly identify the troubled part and perform the restoring work.

For example, when the bearing 56 among the parts of the module of the torch driving body 45 becomes damaged, in a conventional welding head 30, usually the module of the torch driving body 45 cannot be easily removed from the module of the torch body 1, and at least a module of the torch driving body 45 and the module of the torch driving mechanism 22 are made up in an integral structure in many cases.

When the modules are thus integrally constructed, it takes much time in identifying the troubled part, and it is necessary to disassemble many parts such as the torch driving body 45 and the rings 46 and 47 in order to replace the bearing 53 or 56. Besides, since it is a driving mechanism, high-skill operation such as alignment adjustment of rotating shafts has to be performed additionally when it has to be restored.

Accordingly, in the case of the conventional welding head 30 not constituted of modules that can be divided, a long time frame is required from the emergence of trouble to restoration. It can be considered an option to prepare a spare welding head 30 to shorten the restoration period, however it is practically impossible, from the viewpoint of operating costs, to additionally hold a spare apparatus which may not be necessary.

On the other hand, in the case of the welding head 30 which can be divided according to this embodiment, preparing a spare module of the torch driving body 45 in which the alignment adjustment has been completed allows quickly replacing the troubled module and restoration of the welding head. Also, the module which has been detached can have the troubled part replaced and be readjusted, so as to be kept as a spare module for a possible subsequent trouble. Such an arrangement allows carrying only such spare modules that include components more likely to fail, thereby suppressing an increase in cost and shortening the restoration period.

Meanwhile, in order to quickly identify the part that has failed and to suppress the cost of the spare parts, a structural weak point may be intentionally introduced. In other words, a part which is structurally easy to replace and inexpensive may be formed of a material inferior in strength to the associated parts, to thereby designate the troubled part in advance. For example, the spur gears 59*c* and 59*c* of the torch driving mechanism 22 are easy to replace, and inexpensive because of the simple shape. If the spur gears 59*c* and 59*c* are formed of a material inferior in strength to the adjacent spur gear 59*b*, it is the spur gear 59*c* that fails first when an overload is imposed on the driving mechanism. Thus, the troubled part can be quickly identified and spare part costs can be suppressed.

Eighth Embodiment

Hereunder, the non-consumable electrode welding head 30, in which the torch body 1 can be easily attached to and removed from the cooling block 33, will be described.

Figure 22:
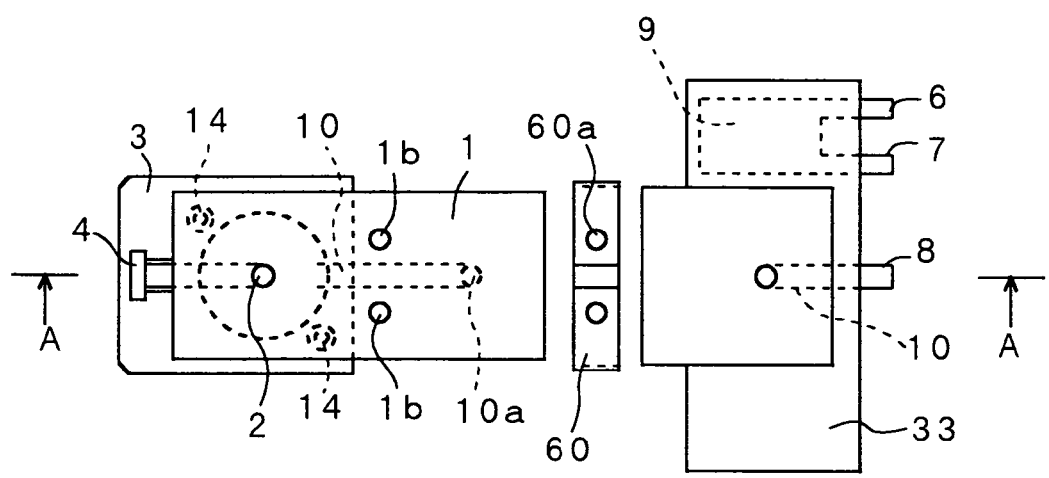
FIG. 22 is a plan view showing the torch body and the cooling block before assembly, according to an embodiment of the present invention.
Figure 23:
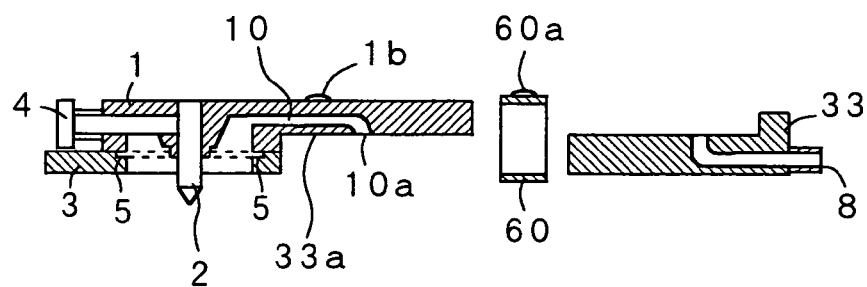
FIG. 23 is a cross-sectional view taken along the line A—A of FIG. 22.

FIG. 22 is a plan view showing the torch body and the cooling block 33 before assembly, according to this embodiment, and FIG. 23 is a cross-sectional view taken along the line A—A of FIG. 22. For the description of this embodiment, the constituents referred to in the foregoing embodiments are given the same numerals, and description thereof will be omitted.

Figure 24:
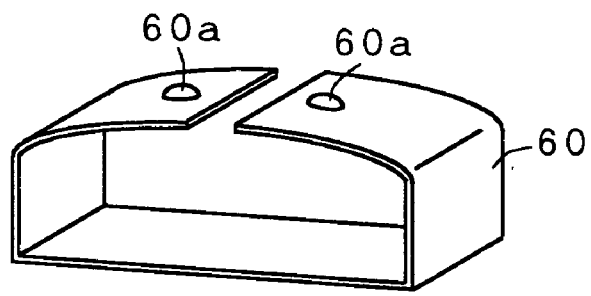
FIG. 24 is a perspective view showing a fastener employed in the non-consumable electrode welding torch of FIG. 22.

In this embodiment, a fastener 60 is employed to mount the welding torch on the cooling block 33. FIG. 24 is a perspective view showing the fastener 60. The fastener 60 is formed of a steel plate strip bent into a ring shape, and in this case a high-tensile steel is employed. The material of the fastener 60 is not limited to the high-tensile steel, but it is preferable to employ a metal having a smaller linear expansion coefficient than the material of the welding torch (a copper alloy in general). The inner dimension of the fastener 60 accords with the outer dimension of the portion in which the torch body 1 and the cooling block 33 are put together.

Hereunder, the function and structure of the components in the torch body 1 and the cooling block 33 will be described. In order to make the torch body 1 easily attachable to and removable from the welding head 30, cables and hoses through which the welding current, welding section protecting gas and coolant for cooling the welding torch are supplied are not connected to the torch body 1, but instead the cooling block 33, to which the torch body 1 is attached, is provided with the cooling power cable joints 6 and 7 and the gas hose joint 8. The gas introduced into the cooling block 33 is supplied to the torch body 1 via the gas supply path joint 10*a*. The welding current is supplied via the interface 33*a* for utilizing the material of the torch body 1 and the cooling block 33 as the conductor. The coolant path 9 is provided only inside the cooling block 33, so as to indirectly cool the torch body 1.

The steps for assembling the torch body 1 and the cooling block 33 will now be described.

First, a tip portion of the cooling block 33 is inserted through the fastener 60, and the base portion of the torch body 1 is inserted in the fastener 60. When the torch body 1 contacts a predetermined position on the interface formed on the upper face of the cooling block 33, a projection 1*b* on the upper face of the torch body 1 and a recessed portion 60*a* on the fastener 60 coincides, so that the torch body 1 and the cooling block 33 are fixed at this position.

Figure 25:
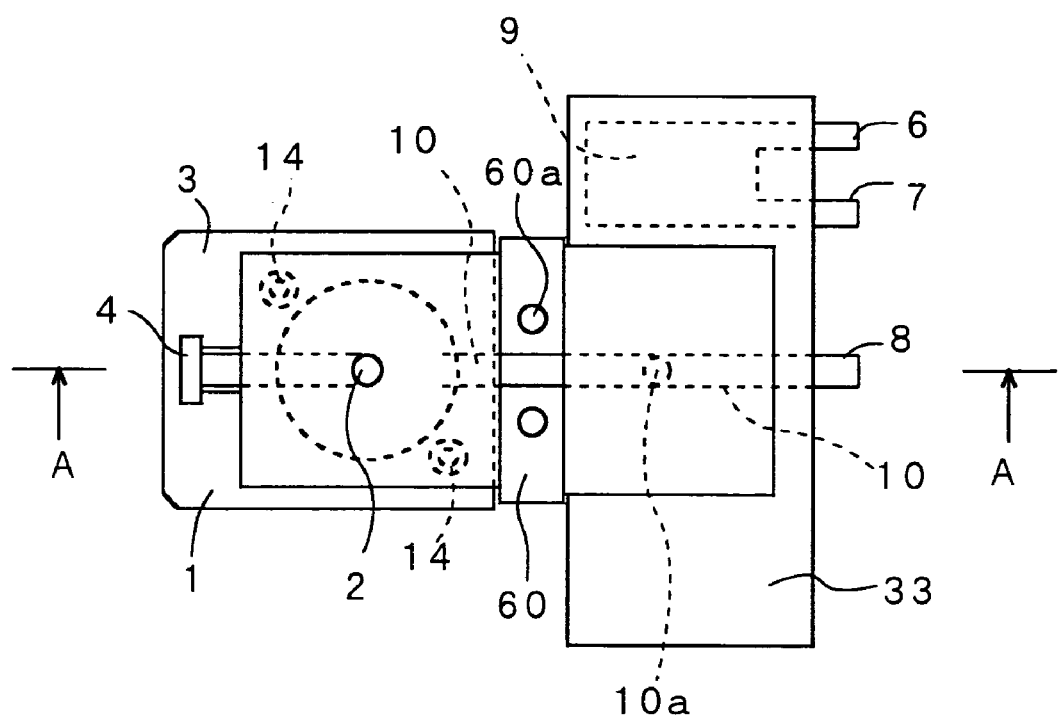
FIG. 25 is a plan view showing the non-consumable electrode welding torch after assembly of the torch body and the cooling block of FIG. 22.
Figure 26:
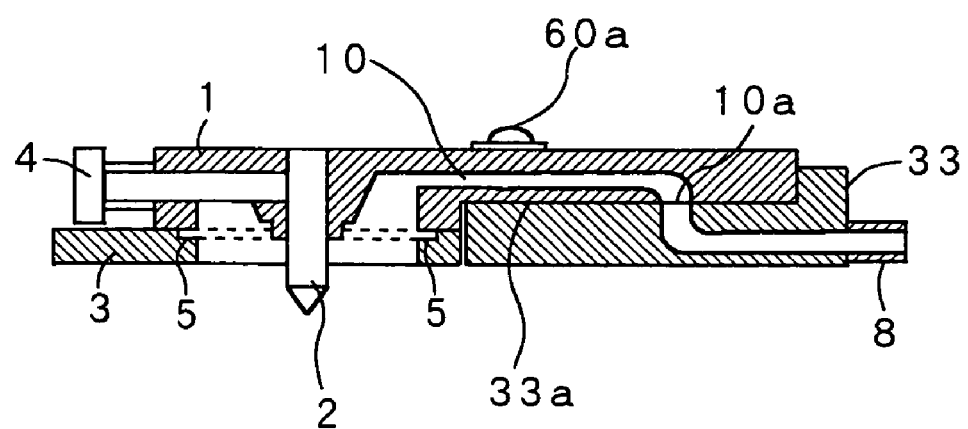
FIG. 26 is a cross-sectional view taken along the line A—A of FIG. 25.

FIG. 25 is a plan view showing the non-consumable electrode welding torch 1 assembled with the cooling block 33 and fixed by the fastener 60, and FIG. 26 is a cross-sectional view taken along the line A—A of FIG. 25.

In the case where foreign matter such as welding sputter chips or grains are stuck to the interface 33*a* between the torch body 1 and the cooling block 33, close contact is not achieved at the interface 33*a* and a gap remains in a conventional screwing system, however, in this embodiment it becomes impossible to squeeze the torch body 1 into the fastener 60, and therefore the operator instantly recognizes the abnormality. When the assembly is successfully completed, the torch body 1 and the cooling block 33 are pressed against each other via the interface 33*a* because of the rigidity of the fastener 60, and the torch body 1 is cooled via the interface 33*a* during the welding operation.

If foreign matter such as fine powders of scores of micrometers in diameter should be stuck to the interface 33*a*, the cooling effect may not be sufficient because of a lack of contact pressure, in which case the temperature of the torch body 1 may slowly rise. According to this embodiment, however, because of the difference in linear expansion coefficient between the torch body 1 and the fastener 60, the torch body 1 is more strongly pressed against the cooling block 33 by the fastener 60 as the temperature becomes higher since the thermal expansion of the fastener 60 is smaller than that of the torch body 1. Therefore as a result, the contact pressure is increased and hence the cooling effect is restored, thus preventing overheating of the torch body 1.

According to this embodiment, the welding torch body 1 can be attached to or removed from the cooling block 33 by a single action, which is much easier than the conventional screwing system. Also this structure facilitates preventing adherence of foreign matter to the mounting face (interface 33*a*) of the torch body 1, and has sufficient robustness of automatically increasing the contact pressure thus to restore the cooling effect even if the cooling effect is degraded for some reason. Consequently, the reliability of the welding performance can be upgraded, and the operating life of the welding head can be prolonged.

Figure 27:
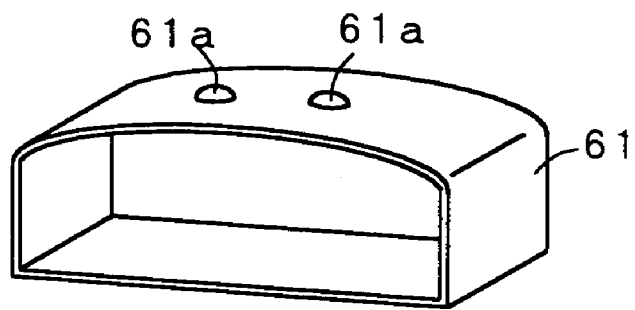
FIG. 27 is a perspective view showing another fastener employed in the non-consumable electrode welding torch of FIG. 22.

FIG. 27 is a perspective view showing another fastener 61 that fixes the torch body 1 and the cooling block 33, formed of a steel plate strip into a ring shape. In this case, though some more power is required to attach the fastener 61, it is as easy as the fastener 60 shown in FIG. 24, compared with the conventional screwing system, and does not incur any inconvenience in improving the work efficiency. The obtained effect is similar to that of the fastener 60 shown in FIG. 24, in addition to which the fastener 61 can bind the torch body 1 and the cooling block 33 more firmly than the fastener 60 shown in FIG. 24, since the fastener 61 is of a ring shape, and is hence suitable for welding operation in a dusty environment.

The material of the fastener 60 and 61 is not limited to a steel, but may be other materials as long as the material has a smaller linear expansion coefficient than the material of the welding torch, which is usually a copper alloy, and of reasonable heat resistance and strength. Heat-resistant ceramics that are of a small linear expansion coefficient may also be employed.

INDUSTRIAL APPLICABILITY

The welding torch according to the present invention can be suitably employed as an ultra-flat non-consumable electrode welding torch that can be mounted on a compact automatic welding head, for welding various types of piping, and provides improvement and stability in the quality of welded products and serves to reduce the number of steps in the welding process.

What is claimed is:

1. A non-consumable electrode welding torch, comprising:
   a torch body;
   a non-consumable electrode fixed inside the torch body so as to project outward from the torch body;
   a gas supply mechanism that supplies a shield gas through a space inside the torch body to a welding section formed at a tip of the non-consumable electrode;
   wherein the gas supply mechanism includes, around the non-consumable electrode;
   a double annular gas space including an outer gas space and an inner gas space divided by a partition wall;
   a gas supply path connected to the outer gas space for introducing the gas from outside of the torch body;
   a plurality of orifices located at regular intervals in the partition wall between the outer gas space and the inner gas space;
   a gas outlet opening provided in the inner gas space, oriented in a direction aligned with a projecting direction of the non-consumable electrode from the torch body, which is different from a blowing direction of the orifices; and
   a filter located at the outlet opening.

2. The non-consumable electrode welding torch according to claim 1, wherein
   a total of a radial sectional area of the plurality of orifices is smaller than a radial sectional area of the gas supply path.

3. The non-consumable electrode welding torch according to claim 1, wherein an intersection of an axial center line of the gas supply path and the partition wall in the double annular gas space is located at a middle point between two orifices adjacent to each other.

4. The non-consumable electrode welding torch according to claim 1, wherein an angle defined by an axial center line of the orifice and a plane of a wall portion of the torch body from which the non-consumable electrode is projecting outward to 0 to 60 degrees with respect to the plane, in an opposite direction to the direction in which the non-consumable electrode is projecting out of the torch body.

5. The non-consumable electrode welding torch according to claim 1, further comprising a ceramic plate attached to an entire wall portion of the torch body from which the non-consumable electrode is projecting outward, except the non-consumable electrode and the gas outlet opening.

6. The non-consumable electrode welding torch according to claim 1, wherein the inner gas space is of an annular shape, in which a sectional area becomes gradually smaller toward the gas outlet opening.

7. The non-consumable electrode welding torch according to claim 6, wherein the inner gas space is of an annular shape, in which an inner diameter thereof gradually becomes greater toward the gas outlet opening, while an outer diameter is constant.

8. The non-consumable electrode welding torch according to claim 1, further comprising, inside the torch body, a gas supply unit which supplies the shield gas to the gas supply mechanism, a power supply unit that supplies power for welding to the non-consumable electrode, and a circulation path for a coolant.

9. The non-consumable electrode welding torch according to claim 1, further comprising a cooling block including a gas supply unit that supplies the shield gas to the gas supply mechanism, a power supply unit that supplies power for welding to the non-consumable electrode, and a coolant circulation path inside, provided as a separate unit from the torch body, wherein the cooling block can be removably attached to the torch body.

10. The non-consumable electrode welding torch according to claim 9, wherein the cooling block and the torch body are respectively provided with a joint portion to be joined via a planar contact, so that the cooling block and the torch body can be removably joined via the joint portion.

11. The non-consumable electrode welding torch according to claim 10, further comprising a cable through which the shield gas is supplied, connected to the gas supply unit in the cooling block, wherein the gas supply unit in the cooling block and the gas supply path connected to the outer gas space outside the torch body are connected via a planar contact at the joint portion with the torch body.

12. The non-consumable electrode welding torch according to claim 10, wherein the joint portions of the cooling block and the torch body are joined with a ring-shaped fastener.

13. A non-consumable electrode welding torch. comprising:
   a torch body;
   a non-consumable electrode fixed inside the torch body so as to project outward from the torch body;
   a gas supply mechanism that supplies a shield gas throuch a space inside the torch body to a welding section formed at a tip of the non-consumable electrode;
   wherein the gas supply mechanism includes, around the non-consumable electrode;
   a double annular gas space including an outer gas space and an inner gas space divided by a partition wall;
   a gas supply path connected to the outer gas space for introducing the gas from outside of the torch body;
   a plurality of orifices located at regular intervals in the partition wall between the outer gas space and the inner gas space;
   a gas outlet opening provided in the inner gas space, oriented in a direction aligned with a projecting direction of the non-consumable electrode from the torch body, which is different from a blowing direction of the orifices; and
   a metal mesh plate located at the outlet opening.

14. The non-consumable electrode welding torch according to claim 13, wherein the wall portion of the torch body around the non-consumable electrode is extended so as to contact the metal mesh plate.

15. A non-consumable electrode welding head, comprising:
   a torch body module including;
      a torch body;
      a non-consumable electrode fixed inside the torch body so as to project outward from the torch body;
      a gas supply mechanism that supplies a shield gas through a space inside the torch body to a welding section formed at a tip of the non-consumable electrode;
      wherein the gas supply mechanism includes, around the non-consumable electrode;
      a double annular gas space including an outer gas space and an inner gas space divided by a partition wall;
      a gas supply path connected to the outer gas space for introducing the gas from outside of the torch body;
      a plurality of orifices located at regular intervals in the partition wall between the outer gas space and the inner gas space;
      a gas outlet opening provided in the inner gas space, oriented in a direction aligned with a projecting direction of the non-consumable electrode from the torch body,
   which is different from a blowing direction of the orifices;
      a metal mesh plate or a filter located at the outlet opening; and
      a cooling block including a gas supply unit that supplies the shield gas to the gas supply mechanism, a power supply unit that supplies power for welding to the non-consumable electrode, and a coolant circulation path inside, provided as a separate unit from the torch body, wherein the cooling block can be removably attached to the torch body;
   a torch mounting base module with the cooling block, on which the torch body module is fixed;
   a torch driving body module that integrally rotates the torch body module and the torch mounting base module around an object to be welded;
   a torch driving mechanism module that supplies power to the torch driving body module; and
   a clamp mechanism module that supports the object to be welded;
   wherein the modules can be removably attached to the welding head in a mechanical manner.

* * * * *